US006654830B1

(12) United States Patent
Taylor et al.

(10) Patent No.: US 6,654,830 B1
(45) Date of Patent: Nov. 25, 2003

(54) METHOD AND SYSTEM FOR MANAGING DATA MIGRATION FOR A STORAGE SYSTEM

(75) Inventors: James A. Taylor, Livermore, CA (US); Alan R. Merrell, Fremont, CA (US); Ronald L. Parks, Danville, CA (US); Alastair Taylor, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/455,106

(22) Filed: Dec. 6, 1999

Related U.S. Application Data

(63) Continuation-in-part of application No. 09/347,042, filed on Jul. 2, 1999, and a continuation-in-part of application No. 09/276,428, filed on Mar. 25, 1999.

(51) Int. Cl.[7] .............................................. G06F 15/16

(52) U.S. Cl. ........................ 710/74; 709/203; 709/213; 709/223; 709/232

(58) Field of Search .......................... 710/74, 306, 311, 710/313, 315; 709/223, 203, 213, 216, 219, 230, 232, 238

(56) References Cited

U.S. PATENT DOCUMENTS 6,000,020 A * 12/1999 Chin et al. .................. 711/162
6,253,240 B1 * 6/2001 Axberg et al. .............. 709/223
6,321,255 B1 * 11/2001 May et al. .................. 709/216
6,351,831 B1 * 2/2002 Sawdy et al. ................. 714/48

FOREIGN PATENT DOCUMENTS

WO WO 99/34297 7/1999
WO WO 00/52576 9/2000

OTHER PUBLICATIONS

*SUN Enterprise Volume Manager 2.5 Admin. Guide*—Chapter 1 pp. 1–1 to 1–15 Copyright 1997.

* cited by examiner

*Primary Examiner*—Kim Huynh
*Assistant Examiner*—Harold Kim
(74) *Attorney, Agent, or Firm*—Hamilton & Terrile, LLP; Stephen A. Terrile

(57) ABSTRACT

A storage network that facilitates the transfer of a data set from a first storage device to a second storage device, without blocking access to the data set during the transfer is provided. An intermediate device for the storage network is provided. The intermediate device comprises a plurality of communication interfaces. Data transfer resources are coupled to the plurality of interfaces, and are used for transferring data access requests identifying the data set from a third interface at least one of a first and second interfaces. A logic engine within the intermediate device is coupled to the interfaces, and is responsive to a control signal to manage the transfer of the data set through the interfaces.

24 Claims, 21 Drawing Sheets

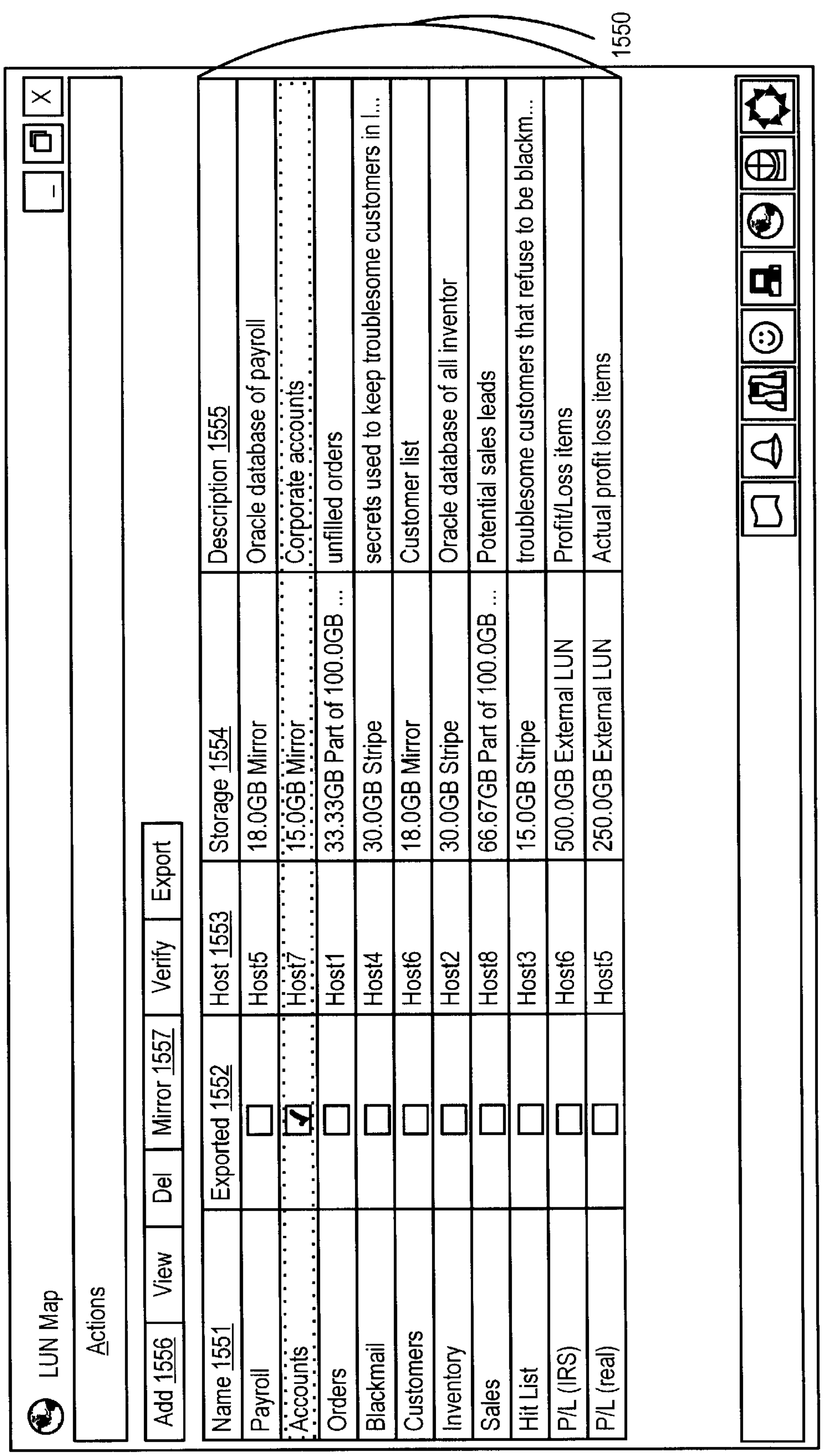

| Name 1551 | Exported 1552 | Host 1553 | Storage 1554 | Description 1555 |
|---|---|---|---|---|
| Payroll | ☐ | Host5 | 18.0GB Mirror | Oracle database of payroll |
| Accounts | ☑ | Host7 | 15.0GB Mirror | Corporate accounts |
| Orders | ☐ | Host1 | 33.33GB Part of 100.0GB ... | unfilled orders |
| Blackmail | ☐ | Host4 | 30.0GB Stripe | secrets used to keep troublesome customers in l... |
| Customers | ☐ | Host6 | 18.0GB Mirror | Customer list |
| Inventory | ☐ | Host2 | 30.0GB Stripe | Oracle database of all inventor |
| Sales | ☐ | Host8 | 66.67GB Part of 100.0GB ... | Potential sales leads |
| Hit List | ☐ | Host3 | 15.0GB Stripe | troublesome customers that refuse to be blackm... |
| P/L (IRS) | ☐ | Host6 | 500.0GB External LUN | Profit/Loss items |
| P/L (real) | ☐ | Host5 | 250.0GB External LUN | Actual profit loss items |

Figure 23

METHOD AND SYSTEM FOR MANAGING DATA MIGRATION FOR A STORAGE SYSTEM

RELATED APPLICATION REFERENCE

The present application is a continuation-in-part of prior, co-pending U.S. patent application Ser. No. 09/276,428, entitled Storage Server System, invented by Shari J. Nolan, Jeffrey S. Nespor, George W. Harris Jr., Jerry Parker Lane, and Alan R. Merrell, filed Mar. 25, 1999; and a continuation-in-part of co-pending U.S. patent application Ser. No. 09/347,042, entitled Virtual Device Architecture for Storage System, invented by Alan R. Merrell, Joseph Altmaier, Jerry Parker Lane and Michael G. Panas, filed Jul. 2, 1999, and such applications are incorporated by reference as if fully set forth herein.

The present invention is related to co-pending U.S. patent application Ser. No. 09/354,110, entitled Graphical User Interface for Configuration of a Storage System, invented by Richard A. Lagueux, Jr., Joel H. Stave, John B. Yeaman, Brian E. Stevens, Robert M. Higgins, and James M. Collins, filed Jul. 15, 1999, which application was owned at the time of invention and is currently owned by the same assignee.

BACKGROUND OF THE INVENTION

1. Field of the Invention

This invention relates to the field of mass storage systems. In particular, the invention relates to the management of storage transactions in, and the configuration of, intelligent storage area networks for the purposes of allocating and changing the allocation of storage resources.

2. Description of the Related Art

The storage of large amounts of data in so-called mass storage systems is becoming a common practice. Mass storage systems typically include storage devices coupled to file servers on data networks. Users in the network communicate with the file servers for access to the data. The file servers are typically connected to specific storage devices via data channels. The data channels are usually implemented with point-to-point communication protocols designed for managing storage transactions.

As the amount of storage increases, and the number of file servers in communication networks grows, the concept of a storage area network (SAN) has arisen. Storage area networks connect a number of mass storage systems in a communication network which is optimized for storage transactions. For example, Fibre Channel arbitrated loop (FC-AL) networks are being implemented as SANs. The SANs support many point-to-point communication sessions between users of the storage systems and the specific storage systems on the SAN.

File servers and other users of the storage systems are configured to communicate with specific storage media. As the storage systems expand or media is replaced in the system, re-configuration is required at the file servers and other users. Also, if a need arises to move a data set from one device to another, in a so-called data migration operation, it is often necessary to block access to the data set during the migration process. After migration is complete, re-configuration at the user system must be executed to make the data available from the new device. The blocking of access to the data set during the transfer is a particularly costly action for large data sets having many users. Both the amount of time required to move a copy of the data to the new device, and the number of people inconvenienced can be very large.

Overall, as the complexity and size of storage systems and networks increase, the problems of managing configuration of the users of the data and of the storage systems themselves multiply. Accordingly, there is a need for systems that simplify management of storage systems, and in particular the migration of data from one device to another, while taking advantage of the flexibility and power of the SAN architecture.

SUMMARY OF THE INVENTION

The present invention provides a method and apparatus for use in a storage network that facilitates the transfer of a data set from a first storage device to a second storage device, without blocking access to the data set during the transfer. In one embodiment, an intermediate device for the storage network is provided. The intermediate device comprises a plurality of communication interfaces, including at least a first interface adapted for communication with the first storage device which stores the data set, a second interface adapted for communication with a second storage device, and a third interface adapted for communication with a client processor. Data transfer resources are coupled to the plurality interfaces, and are used for transferring data access requests identifying the data set from the third interface to at least one of the first and second interfaces. A logic engine within the intermediate device is coupled to the first and second interfaces, and is responsive to a control signal to manage the transfer of the data set through the first interface from the first storage device, and through the second interface to the second storage device without blocking the transfer data access requests from the client processor.

According to various embodiments of the invention, the logic engine comprises data structures that store information, such as status information, information identifying the data set, and other data concerning the transfer. In one embodiment, the intermediate device stores a parameter indicating an extent of the data set which is already copied to the second storage device.

According to other aspects of the invention, the data transfer resources include logic operable during the transfer of the data set which direct data access requests to the first and second storage devices in response to a type of data access request, and a status of the transfer. In one embodiment, when the data access request comprises a request to write data in the data set, the data transfer resources direct the data access request to both the first and second storage devices if the request identifies data already copied to the second device. In another embodiment, when the data access request comprises a request to read data in the data set, the data transfer resources include logic to direct the data access request to one or both of the first and second storage devices.

In one embodiment of the invention, logic is included to assign a priority to the transfer in relation to data access requests from the client processor, and to manage the transfer in response to the priority. For example, a high priority is set to the data access requests relative to the transfer. In this manner, the client processor does not experience significant delays obtaining fulfillment of its data access requests during the transfer.

According to other embodiments of the invention, the data transfer resources comprise a plurality of driver modules, and configurable logic linking driver modules into data paths, so that data paths include respective sets of driver modules. The plurality of driver modules includes one or more hardware driver modules to managers of communication interfaces, and one or more internal driver modules to perform data path tasks independently of the plurality of communication interfaces.

According to another embodiment of the invention, the data transfer resources comprise redundant data paths supporting reliability and substantially continuous operation.

According to another embodiment of the invention, a user interface is provided on the intermediate device, providing input by which control signals are supplied to control the hot copy process.

The present invention also provides a method for copying a data set in use by a client, and stored in the first device, and supplying the copy to the second device. The method includes placing an intermediate device in a path between the client and first and second storage devices. The method also includes a step of transferring copies of blocks of data in the data set from the first device to the second device through the intermediate device, until a copy of the data set is stored in the second device. During the transferring of the copies of blocks, the method provides for transferring data access requests having one of a plurality of types, from the client through the intermediate device to at least one of the first and second devices in response to progress of the transfer of the copies of blocks of data in the data set, and in response to the type of data access request.

According to one embodiment of the invention, the step of transferring copies of blocks includes:

(i) setting a parameter indicating a size and location of the data set;

(ii) generating a request to copy a block from the data set to a buffer in the intermediate device;

(iii) generating a request to transfer the block from the buffer to the second device;

(iv) setting a parameter indicating blocks from the data set stored in the second device; and (v) repeating the steps (ii) through (iv), until a copy of the data set is stored in the second device.

In one embodiment of the invention, the method includes fulfilling the data access requests through the intermediate device.

In another embodiment of the method, the step of transferring copies of blocks comprises a background process executed without blocking data access requests from the client.

According to yet another embodiment, the present invention provides a storage server having sophisticated data processing resources for the purposes of controlling the routing of data storage transactions, and the migration of data sets among a pool of storage devices. The data processing resources comprise a plurality of driver modules and configurable logic linking driver modules into data paths. Each configured data path acts as a virtual circuit that includes a set of driver modules selected from the plurality of driver modules. A data storage transaction which is received at a communication interface is mapped to one of the configured data paths according to the initiating host and according to the logical address of the storage extent subject of the transaction. Upon completion of a hot copy process, the configuration of the data path is changed to direct the session including the transaction to the new location of the data. During the transferring, the hot copy process manages routing of the reads and writes in the data path according to the status of the hot copy process.

According to another aspect of the invention, the plurality of driver modules includes a protocol server for a protocol supported on a communication interface in the plurality of communication interfaces. The protocol server recognizes target identifiers, or logical addresses, which identify particular storage extents according to the protocol on the interface. Transactions addressed to the particular storage extent are mapped to a particular configured data path in the server.

The data paths configured in this manner act as virtual storage devices. Users of the data communicate with a communication interface on the storage server according to a protocol for a particular storage device. Inside the server, the transactions according to that protocol are mapped to a virtual storage device implemented by sets of drivers. Setting up and changing the storage tasks performed in a particular data path, and setting up and changing the mapping of a storage extent from one data path to another are accomplished by configuring the sets of driver modules within the storage server.

The present invention provides an intelligent storage routing device which manages logical and physical access to a pool of shared storage devices, and transfer of data sets among the storage devices without blocking access to the data sets. The device is logically closer to the client server than to the storage devices, and responds to client specific requests for storage transactions which require accessing and sharing a storage area network coupled to the device. The device manages the use of a cache memory to enhance performance. Very large data sets, on the order of many terabytes in size or more, can be transferred from old to new storage devices, or vice versa, as the storage resources in a network change, without blocking access to the data sets.

Other aspects and advantages of the present invention can be seen upon review of the figures, the detailed description and the claims which follow.

BRIEF DESCRIPTION OF THE FIGURES

FIG. 23 illustrates an image used for creating virtual circuits, and mapping logical addresses to virtual circuits according to the present invention.

DETAILED DESCRIPTION

Overview

Figure 1:
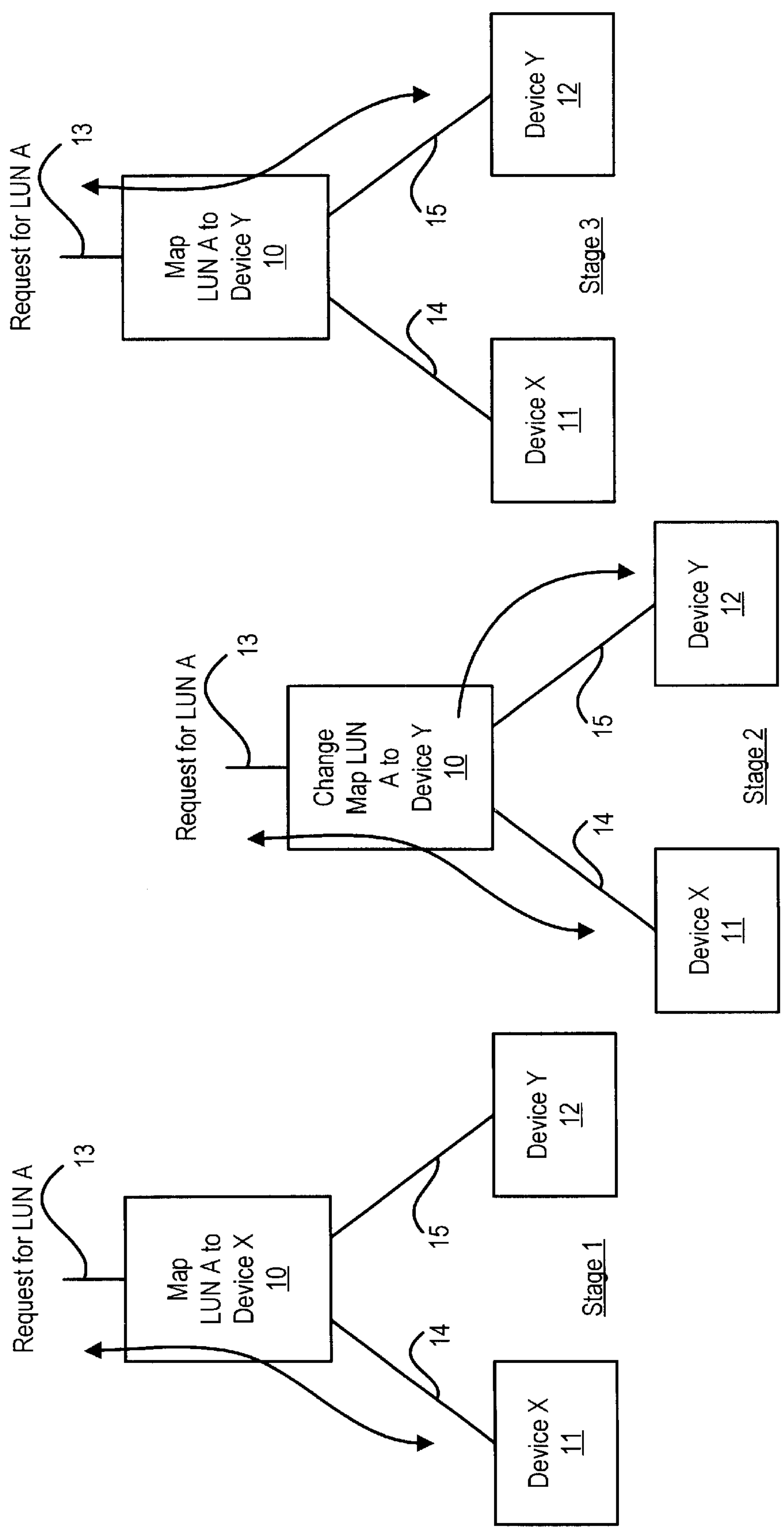
FIG. 1 is a simplified diagram of a network having an intermediate device with hot copy resources in three stages, according to the present invention.

FIG. 1 is a simplified diagram showing three stages of data flow in a storage network having an intermediate device 10 coupled to the first storage device 11 across communication link 14, and a second storage device 12 across communication link 15. The intermediate device 10 is also coupled to a client processor via communication link 13, by which it receives a request for access to data at logical address LUN A.

The device 10 includes memory for use as buffers, data transfer resources for transferring data access requests received on link 13 to the storage devices accessible across links 14 and 15. Also the intermediate device includes a logic engine to manage hot copy processes according to the present invention. This process can be understood by considering the three stages shown in FIG. 1.

In Stage 1, the intermediate device 10 maps all data access requests identifying the data set subject of the transfer and received on interface to link 13, to the link 14 for connection to the device 11, which stores the data set subject of the request. The intermediate device receives a control signal initiating a hot copy process and identifying a target device, in this example the device 12. This step initiates Stage 2, during which the data set is transferred as a background process from the first device 11 through the intermediate device 10, into the second device 12. Parameters are maintained on the intermediate device 10 indicating the progress of the transfer of the data set, and indicating a relative priority of the background hot copy process with respect to the data access requests from the client processor. During the hot copy process, data access requests are mapped to the first device 11 and the second device 12 depending on the progress of the hot copy, and on the type of request. Also, the intermediate device includes resources for assigning a priority to the hot copy process. If the priority of the hot copy process is low, then the client processor does not experience significant delay in fulfillment of its data access requests. If the priority of the hot copy process is relatively high, then the client processor may experience some delay in fulfillment of its data access requests, but the hot copy process will complete more quickly.

Upon completion of the transfer of the data set, Stage 3 is reached. In Stage 3, the data access requests from the client processor addressed to the data set are routed to the second device 12 across communication link 15. The storage device 11 may be removed from the network altogether, or utilized for other purposes.

The intermediate device 10, may comprise a special purpose "thin" processor designed for insertion in a network between the client processors and the first and second devices 11, 12. In other systems, the intermediate device comprises a more sophisticated intelligent storage server. The level of intelligence and the performance of the intermediate device can be modified to meet a variety of conditions and product configurations as suits a particular need.

The storage devices 11 and 12 are illustrated in FIG. 1 as independent devices. However, the storage devices may comprise logical partitions within a single storage unit. In this case, the hot copy process results in migration of the data from one address within the storage unit to another address.

Communication among the client processors, the intermediate devices and the storage devices is provided over FC-AL links in a preferred embodiment, accomplished using a protocol compliant with the standard Small Computer System Interface version 3 (SCSI-3) preferably using a Fibre Channel medium, also termed fibre channel protocol (FCP) (e.g., SCSI-X3T10 and FCP X3.269-199X). In other embodiments, protocols such as the Internet Protocol are used over the communication links carrying storage transactions on a variety of media and in a variety of protocols. In some embodiments, the intermediate device supports multiple protocols. Other protocols include such protocols as the High Performance Parallel Interface (HIPPI), the Intelligent Peripheral Interface (IPI) and other protocols combined with or in place of these examples. According to each of these protocols, storage transactions can be executed which identify particular target data sets within storage extents, such as using the SCSI target ID and a Logical Unit Number (LUN). Thus, in this example, a storage transaction which identifies a SCSI target ID and a LUN, can be mapped in response to the target ID and the LUN to a particular virtual circuit in the intermediate device.

An Intelligent Storage Area Network Server

Figure 2:
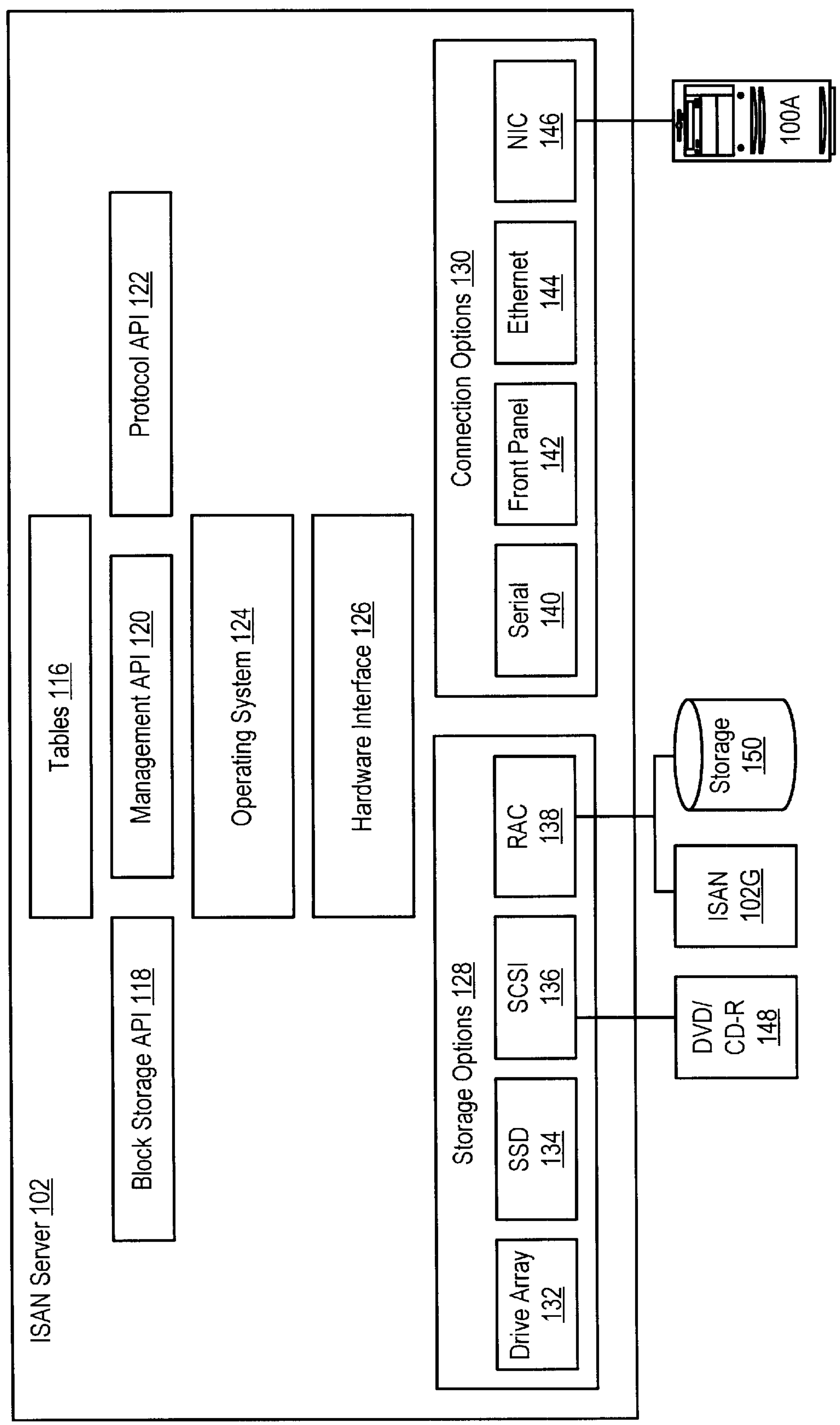
FIG. 2 is a block diagram of an intelligent storage area network server.

FIG. 2 is a block diagram of an ISAN server in one preferred embodiment, such as the ISAN server 102A, or some other ISAN server configured for executing the hot copy process of the present invention.

The ISAN server 102A has connection options 130 including a set of communication interfaces adapted for users and for other data processing functions, and storage options 128 including a set of communication interfaces adapted for storage devices. The ISAN server 102A has a hardware interface 126, an operating system 124, a block storage interface 118, a management interface 120, and a protocol interface 122. The connection options 130 include serial connections 140, a front panel connection 142 supporting a configuration management routine in one embodiment, an Ethernet connection 144 supporting communication with a remote management station, and a network interface 146. The storage options 128 include the drive array 132, the solid state drive (SSD) 134, the SCSI interface 136, and the network interface 138. The SCSI interface 136 is coupled to a DVD/CD-R 148. The network interface 138 is coupled to an ISAN server 102G and/or storage 150.

The connection options 130 are various methods of connecting servers and clients to the ISAN server 102A. The serial connections 140 support network management, modems for remote management, and uninterruptible power supply messages. The front panel connection 142 supports a management connection with the front panel display of the ISAN server 102A. The Ethernet connection 144 supports an Ethernet interface for management protocols and possibly for data transfer. The network interface 146 is one of potentially many high speed interfaces on the server. In some embodiments, the network interface 146 is a fibre channel interface with drivers for a fibre channel arbitrated loop (FC-AL). The network interface 146 may also include drivers for SCSI-3 over the fibre channel medium using fibre channel protocol (FCP).

The hardware interface 126 provides interface specific hardware components.For example, the network interface 146 has a network interface specific set of software modules to support configuration, diagnostics, performance monitoring, and health and status monitoring.

The operating system 124, the tables 116, and the interfaces 118–122 support the virtual device and storage routing functionality of the ISAN server 102A. These components of the ISAN server 102A route storage transactions among appropriate storage options 128 and the connection options 130 using configured sets of driver modules in the system.

The operating system 124 provides message routing and transport facilities in addition to fail-safe facilities. The message routing and transport facilities of the operating system 124 are used to route messages, including storage transactions, between the components of the ISAN Server 102B. These messages include messages in the internal format between components of a virtual circuit. These messages can also include control messages in other formats.

The block storage interface 118 provides software modules to support block data transfers. The interface 118 includes support for striped data storage, mirrored data storage, partitioned data storage, memory cache storage, and RAID storage. The different supported storage types can be linked to form various combinations such as a mirrored data storage with a memory cache.

The protocol interface 122 provides software modules for translating and responding to requests in a variety of protocols. One set of modules is provided for the layers of an Ethernet connection: the hardware driver, the data link driver, the Internet protocol (IP) driver, the transmission control protocol (TCP) driver, the user datagram protocol (UDP) driver, and other drivers. Another set of modules provides drivers for FCP.

The management interface 120 provides software modules for managing the ISAN server 102A. The management interface 120 contains interfaces for managing access to the tables 116. The management interface 120 also contains interfaces for rules based management of the system including: scheduling, or process orchestration; monitoring the system; informed consent management; and handling system processes and events. The informed consent management module is premised on providing rules based management suggestions for configuring and maintaining the ISAN server 102A.

Handling Storage Transactions

Storage transactions are received over one of the connection options 130. Storage transactions include read and write requests as well as status inquiries. The requests may be block oriented.

A typical read storage transaction is comprised of the read command and addressing information. A write storage transaction is similar to the read storage transaction except the request includes information about the amount of data to be sent and is followed by the data to be written. More specifically, using the SCSI-3 protocol, each device has an identifier (ID). The machine issuing the request is called the initiator and the machine responding to the request is called the target. In this example, the server 100A is the initiator and has ID 7. In this example, the ISAN server 102A is the target and has ID 6. The SCSI-3 protocol provides for two or more addressing components, a logical unit number (LUN) and an address.

The LUN specifies a subcomponent of the target ID. For example, in a combined hard disk/tape drive enclosure, the two devices might share an ID, but have different LUNs. The third addressing component is the address where the device data is to be read from or stored to. The ISAN server 102A provides for virtual LUNs on a per initiator basis. Thus a single ISAN server 102A might support, for example, ten thousand virtual LUNs or more.

The ISAN server 102A will map the SCSI-3 storage transaction request to a virtual circuit corresponding to a virtual LUN. A virtual circuit is a sequence of one or more virtual devices. A virtual device is a composed of one or more devices such as software modules or hardware components. For example, two network interface devices could be combined to be a virtual device. Similarly, two cache devices could be combined as a virtual device. This design permits components to fail without disrupting the storage transaction processing capabilities of the ISAN server 102A.

A virtual circuit comprises the necessary virtual devices to support a storage transaction. Typically, the first component in the virtual circuit is a driver for translation of the storage transaction from the storage transaction communication channel format, FCP in this example, to an internal format. One such internal format may be similar to the intelligent input and output ($I_1O$) block storage architecture (BSA) message format. The internal format is storage medium and communication channel neutral in the preferred system.

The intermediate virtual devices of a virtual circuit provide additional services such as caching, mirroring, RAID, etc. Because the internal format is storage medium neutral, all of the intermediate virtual devices can be designed to operate on the internal format and thus interoperate with other virtual devices in the circuit.

The final virtual device in a virtual circuit is typically the format translation and the communication channel drivers for controlling the storage. For example, the drive array 132 is controlled by redundant hardware driver modules (HDMs) that are grouped to form a virtual device. The HDMs provide BSA to SCSI translation, and the HDMs handle the interface to the drives that compose the drive array 132. Similarly, if the virtual circuit is a link to some other type of storage over the network interface 138, there will be a virtual device with support for BSA translation to the storage device communication channel protocol.

The storage server also includes resources in the operating system and at the interfaces to the client servers which emulate physical storage devices. The emulation allows the virtual devices to appear to the client servers accessing the storage as if they were physical devices. Thus, the client servers can be configured to communicate using standard protocols, such as FCP using SCSI commands for storage transactions. In the embodiment utilizing SCSI commands, the emulation involves responding to an inquiry command according to the SCSI protocol with device identifiers and device capability information expected by, or compatible with, the initiating server. Also, a read capacity command and a mode page data command in the SCSI protocol are handled by the emulation resources in a manner that allows the client servers using the storage to rely on standard configuration information for physical storage devices, while the storage server spoofs the client server by emulating the physical storage devices at the interface with the client server, and maps actual storage transactions to virtual devices. The emulation resources also allow the virtual devices to be identified by the combination of an initiator, a logical unit number (LUN), and a target device identifier, without requiring the storage transaction to be tied to the specific physical target device identified in the request.

Storage Routing

The ISAN server 102B supports storage routing. For example, if the server 100A is originally coupled to the storage 150 in a SAN, the ISAN server 102B can be added to the SAN between the server 100A and the storage 150 to provide new functionality and easier administration by supporting storage routing.

In the original configuration, the server 100A provides data backup and archiving functionality. The backup and archiving functions tie up the processor of the server 100A with important but bandwidth intensive functions. In the configuration of FIG. 2, the ISAN server 102A acts as a storage router for storage transactions requested by the server 100A. The ISAN server 102A can then direct backups and archiving without tying up the server.

The ISAN server 102A provides another advantage in adding a larger storage device. For example, if storage 150 is a terabyte drive array and a new drive array that supports sixteen terabytes of storage is being brought onto the network, the ISAN server 102A can migrate the data to the new array without consuming processor time on the server 100A. Further, the mirroring drivers support intelligent read and write functionality that allow the storage 150 to be shifted to the new drive array without disrupting access to the data.

Thus, as data is moved to the new storage array, read and write requests for those portions of the data will be directed to the new array while requests for other data portions will be directed to the old storage 150. Once the migration is complete, the virtual circuit can be adjusted to remove the storage 150 from the virtual circuit.

The ISAN server 102A, in one embodiment, provides a platform for cache memory which is shared among a plurality of virtual circuits.

Because a storage transaction is not linked to a data store, it is possible to change the data stores supporting a virtual circuit as storage needs change or as different storage equipment is used.

Hardware Architecture Overview

Figure 3:
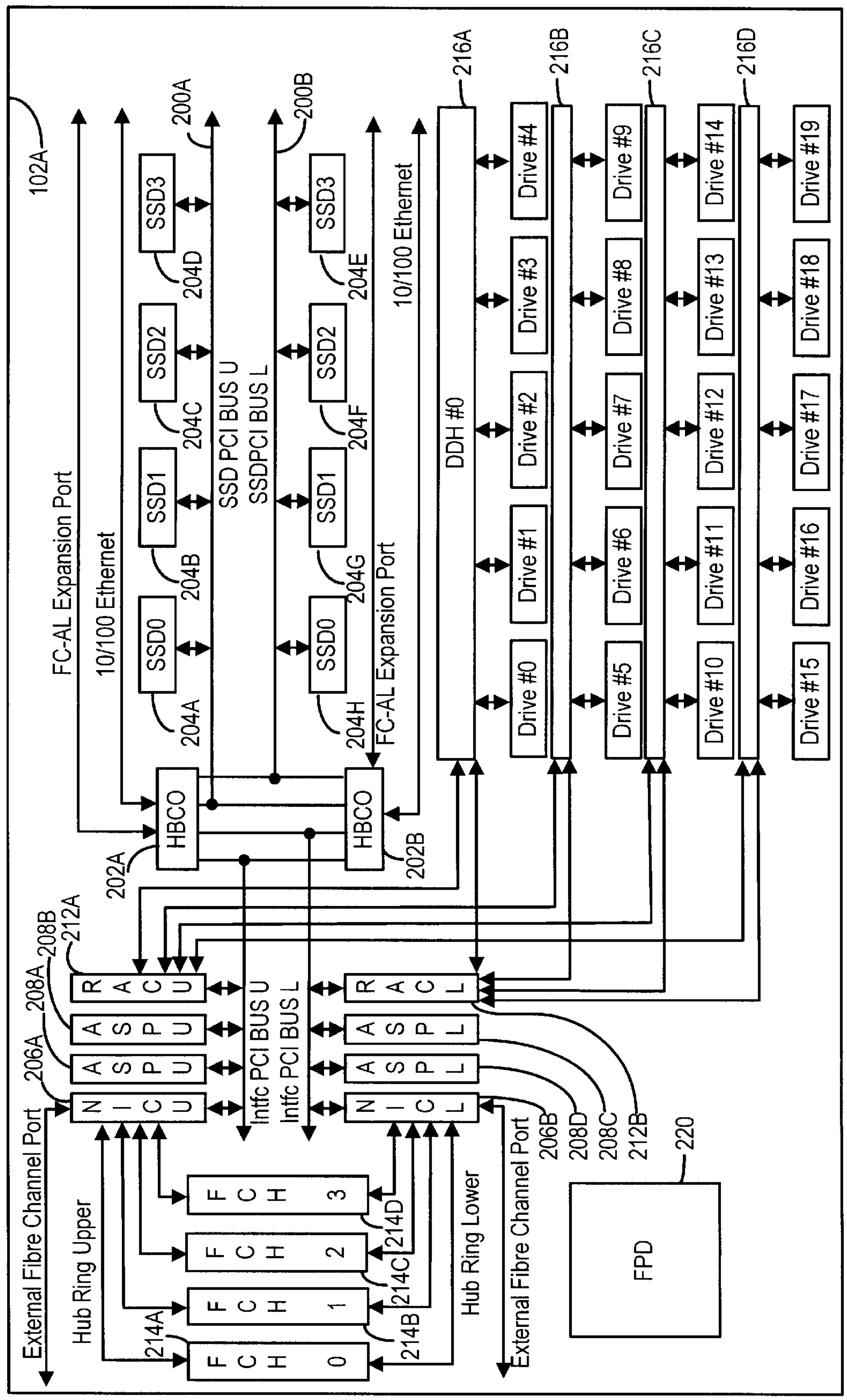
FIG. 3 is a block diagram of the hardware architecture of an intelligent storage area network server with hot copy resources.

FIG. 3 is a block diagram of one suitable hardware architecture of an intelligent storage area network (ISAN) server. The hardware architecture implements redundancy and supports distributed software systems to prevent any one single point of failure from interfering with a particular storage transaction.

FIG. 3 includes the ISAN server 102A. The ISAN server is designed to provide a high degree of redundancy while using standard components and the standard based devices. For example, the ISAN server 102A uses a high speed version of the standard peripheral component interconnect (PCI) implementation and standard fibre channel arbitrated loop (FC-AL) interfaces. A variety of other protocols and interfaces can be used in other embodiments.

The ISAN server 102A has four separate 64-bit 66 MHz PCI busses 200A–D. Many different configurations of storage devices and network interfaces in the slots of the PCI busses are possible. In one embodiment, the PCI busses are divided into two groups: the SSD PCI busses 200A–B and the interface PCI busses 200C–D. Each group has two busses that are designated by the terms upper and lower. The upper and lower busses in each group can be configured to provide redundant services. For example, the lower SSD PCI bus 200B has the same configuration as the upper SSD PCI bus 200A.

The PCI busses 200A–D are connected to host bridge controller (HBC) modules 202A–B. The HBC modules 202A–B span the PCI busses 200A–D and provide redundant bridging paths.

The SSD PCI busses 200A–B support solid state drive (SSD) modules 204A–G. The SSD modules 204A–G provide solid state storage devices such as a flash memory store.

The interface PCI busses provide an interconnection from the network interface controller (NIC) modules 206A–B, the redundant arrays of independent disks (RAID) Controller (RAC) modules 212A–B, and application specific processing (ASP) modules 208A–D to the HBC modules 202A–B.

In addition to coupling the ISAN server 102A to the external FC-AL, the NICs 206A–B can be coupled to fibre channel hub (FCH) modules 214A–D. Each FCH module 214A–D is coupled to both NIC modules 206A–B. Each FCH module 214A–D provides ten FC-AL ports, and can be cascaded through the NIC modules 206A–B to provide a twenty station FC-AL hub.

The disk drive hub (DDH) modules 216A–D provide a redundant FC-AL fabric to connect disk drives to the RAC modules 212A–B. The FC-AL fabric in each of the DDH modules 216A–D comprises two redundant loops, which couple all of the drives attached to the DDH module with both RAC modules 212A–B. The RAC modules manage a loop among all of the DDH modules 216A–D. The DDH modules 216A–D each support five dual-ported disk drives such as the disk drive 218.

The system mid-plane (SMP) is not depicted in FIG. 3. The SMP is a passive mid-plane that provides the interconnections shown in FIG. 3 between the HBC module 202A–B, the SSD modules 204A–H, the RAC modules 212A–B, the NIC modules 206A–B, the FCH modules 214A–D, the DDH modules 216A–D, and the ASP modules 208A–D. The SMP is compact PCI based, with four custom compact PCI busses 200A–D, RAC-DDH interconnections, and NIC-FCH interconnections and miscellaneous control busses comprising the mid-plane signals. In addition, the SMP provides power distribution from the power subsystem, not depicted in FIG. 3, to the modules, at voltages of 48V, 12V, 5V, and 3.3V.

The front panel display (FPD) 220 provides a user interface for the ISAN server 102A. The FPD contains a display device and an input device. In one embodiment, a touch sensitive liquid crystal display (LCD) is used to present a touch sensitive screen with input capabilities. The FPD 220 is coupled to the HBC modules 202A–B to support status displays, configuration display and management, and other management functions.

Power and fan subsystems, not depicted in FIG. 3, provide redundant AC to DC power supplies, redundant DC to DC power conversion, battery backup for power down, and a redundant push-pull fan subsystem. These components support the high availability and low down time features that are important when a storage area network is deployed.

The ISAN server 102A can be coupled to other ISAN servers to appear as a single network port in a storage area network or as a network attached storage device. This coupling can be done over the FC-AL expansion ports that are coupled to each of the HBC modules 202A–B. Additionally, the HBC modules 202A–B offer RS232 serial ports and 10/100 Ethernet ports for out-of-band management.

The bus system includes all of the buses in the ISAN server 102A. In this example, the bus system includes the four PCI buses interconnected by the host bridge controllers. The bus system also includes the PCI buses internal to the HBC modules that provide additional interfaces. The slots include all of the positions on the bus system which can receive interfaces. In this example, each of the four PCI buses outside of the HBC modules can accommodate four interfaces.

The interfaces are the cards or other devices that are placed in the slots.The interfaces support drivers and hardware for the data stores coupled to the interfaces.

Redundancy and Fail-Over

The ISAN server 102A offers a high degree of redundancy. In one embodiment, there are redundant NIC, RAC, and HBC modules. The SSD modules and drives support mirroring. The drives also support parity and dual channel access. Each DDH module contains a fully redundant FC-AL fabric for connection to the RAC modules. Fail-over is handled by the HBC modules, which control the other modules in the ISAN server. The control is multi-layered.

The HBC module's first layer of control-over is the power supply control. Each module has an individual power supply enable signal that is controlled by the CMB controller on the module. Although the HBC modules are redundant, only one HBC module will serve as the master HBC module and direct and control the system. The other HBC will act as a slave. When a module is plugged into a slot, its power supply is initially disabled. Only the master HBC module can enable the power supply. If a module begins to perform improperly and does not respond to commands, the HBC module can disable the power supply to the module.

The second layer of control for the HBC modules is the card management bus (CMB). Each module has an Atmel AT90S8515 (AVR) microcontroller that is coupled to the CMB. The HBC module itself has an AVR microcontroller 316 coupled to the CMB that can act as a master or as a slave. The CMB microcontroller is powered by a connection to the midplane independently of power supplied to the main processor on the module. The CMB allows the master HBC to read a card type, determine if a card is present, send a non-maskable interrupt to a card or perform a hard reset of a card. Module processors and the master HBC module can also perform communication through a serial port on the AVR microcontroller on the module. This communication path can be used as a backup for control communication in the event of a PCI failure.

The third level of control for the HBC modules is the PCI bus. If a module does not respond using a control process on the PCI bus, it can be queried via the CMB. If the module still does not respond, a non-maskable interrupt can be set via the CMB. If the module still does not respond, it can be reset via the CMB. If after reset, the module still does not respond, it can be powered down and a warning can be issued to replace the module.

Software Architecture Overview

An ISAN server is supported by an operating system that is designed to support the uniquely high bandwidth, high throughput, and demands of a storage server. The operating systems schedules and controls data transfers over the bus systems and manages the system. Although a number of different operating system and software component structures are possible, in one embodiment, a highly modular operating system designed for a storage server is used.

Figure 4:
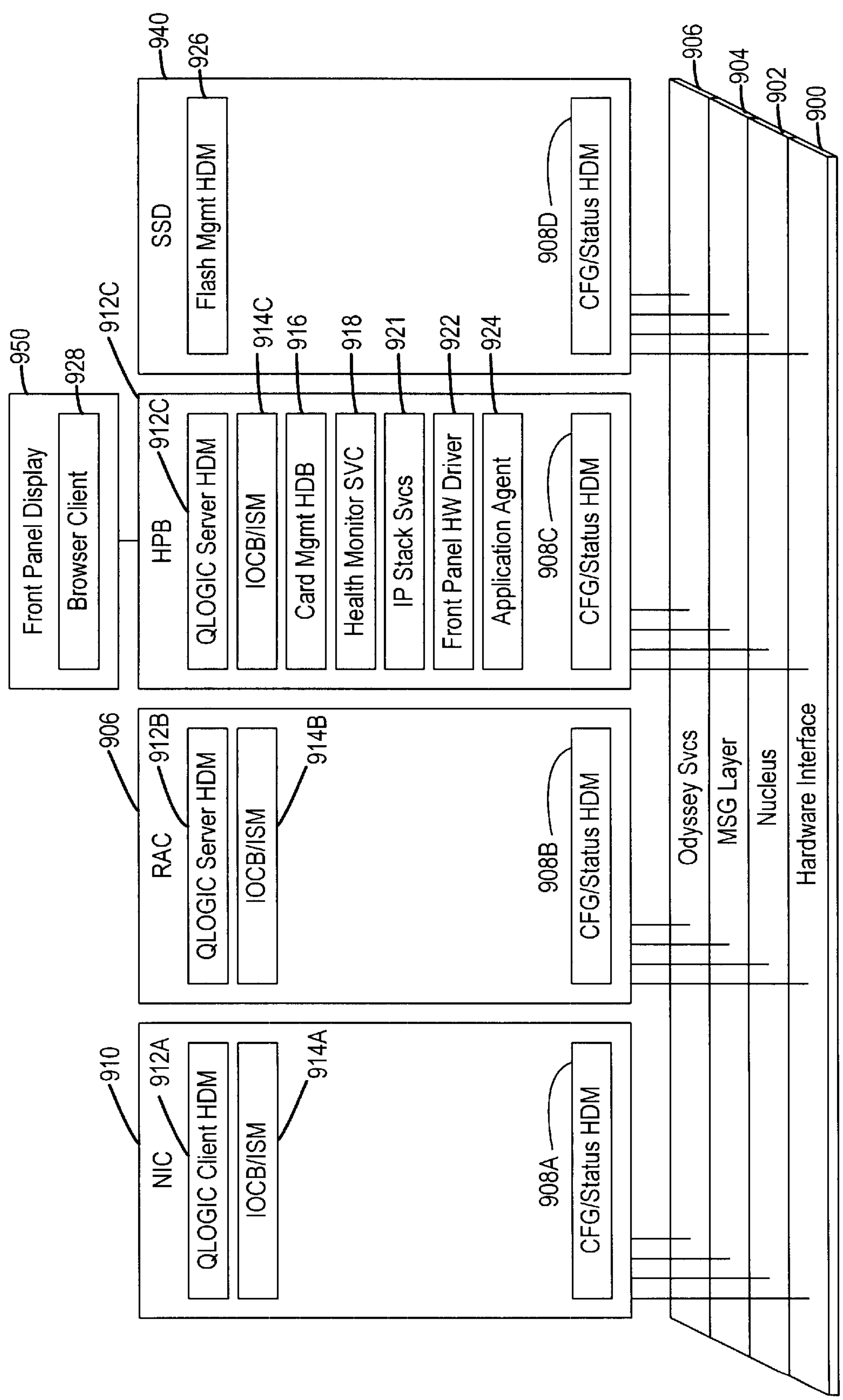
FIG. 4 is a block diagram of the software modules of an operating system and supporting programs for an intelligent storage area network server.

FIG. 4 is a block diagram of the software modules of an operating system and supporting programs for an ISAN server.

FIG. 4 includes the following operating system components: the hardware interface module 900, the Nucleus PLUS™ real-time kernel module 902 available from Accelerated Technologies, Inc., Mobile, Ala., the ISOS protocol management module 904, and the storage services module 906. The hardware interface module 900 allows the software components of the ISAN server to communicate with the hardware components of the ISAN server.

The Nucleus PLUS™ real-time kernel module 902 is used to provide basic operating system functions such as: tasks, queues, semaphores, timers, and critical section support. The Nucleus PLUS™ real-time kernel module 902 is exported to the software modules of the ISAN server as functions in C++ classes by the storage services module 906.

The ISOS module 904 permits the ISAN server to support a messaging architecture for input and output. The hardware modules such as the RAID controller (RAC) modules, the network interface controller (NIC) modules, the solid state drive (SSD) modules, the disk drive hub (DDH) modules, and the fibre channel hub (FCH) modules, are all input/output processors (IOPs). The master host bridge processor (HBC) module serves as the host.

The storage services module 906 implements messaging classes to support the reliable transport of messages between components. The storage services module 906 supports the operation of device driver modules and support for virtual devices. The device driver modules (DDMs) and virtual devices (VDs) are the building blocks of the ISAN server storage system. The storage services module 906 is organized around providing support for requests for storage transactions.

In some applications, a single ISAN server such as the ISAN server 102A will have several hundred DDMs operating in conjunction with the operating system modules 900–906 to support responses to storage server requests. Other applications use a few DDMs in various combinations.

Software components are implemented as device driver modules (DDMs). A DDM that primarily services requests for a hardware device is termed a hardware driver module (HDM). A DDM that serves as an internal, intermediate program is termed an intermediate service module (ISM). For example, the DDMs that service the SSD modules are termed HDMs. The DDMs that provide cache services, mirroring services, and other types of services not directly linked to a hardware device could be termed ISMs.

A single DDM can have multiple instantiations on a single ISAN server. For example, in FIG. 4, there are four instantiations of the performance, health and status PHS monitor 908A–D, one for each of the four major software subsystems: the NIC 910, the RAC 920, the HBC 930, and the SSD 940. Each DDM has its own message queue and a unique identifier. For example, the PHS monitor 908A on the NIC 910 might be device id (DID) 0. Each DDM also lists the class of storage requests handled by the DDM and the operating system modules route the requests to the DDMs based on the class of the storage request. Requests can be routed by request codes or by virtual device numbers.

The NIC software subsystem 910 includes three DDMs: a processor support HDM 912A, an input/output translation ISM 914A and the PHS monitor 908A. The RAC software subsystem 920 includes three DDMs: a processor support HDM 912B, an input/output translation ISM 914B, and a PHS monitor 908B. The HBC software subsystem 930 includes: a processor support HDM 912C, an input/output translation ISM 914C, a card management HDM 916, a system monitor DDM 918, an Internet Protocol DDM 921, a front panel display DDM 922, an application specific processor support DDM 924, and a PHS monitor 908C. The SSD software subsystem 926 includes a solid state drive management HDM 926 and a PHS monitor 908D. The front panel display 950 supports a hypertext markup language (HTML) client 928.

FIGS. 5, 6, 7, and 8 illustrate various aspects of a software implementation of a hot copy process for execution in the intelligent network server described above. In other intermediate devices used for a hot copy process, variations in the implementation will be made to accommodate the particular system. More details of components of a virtual circuit, persistent table storage, and user interface structures are described with reference to FIG. 9, and the following figures.

Figure 5:
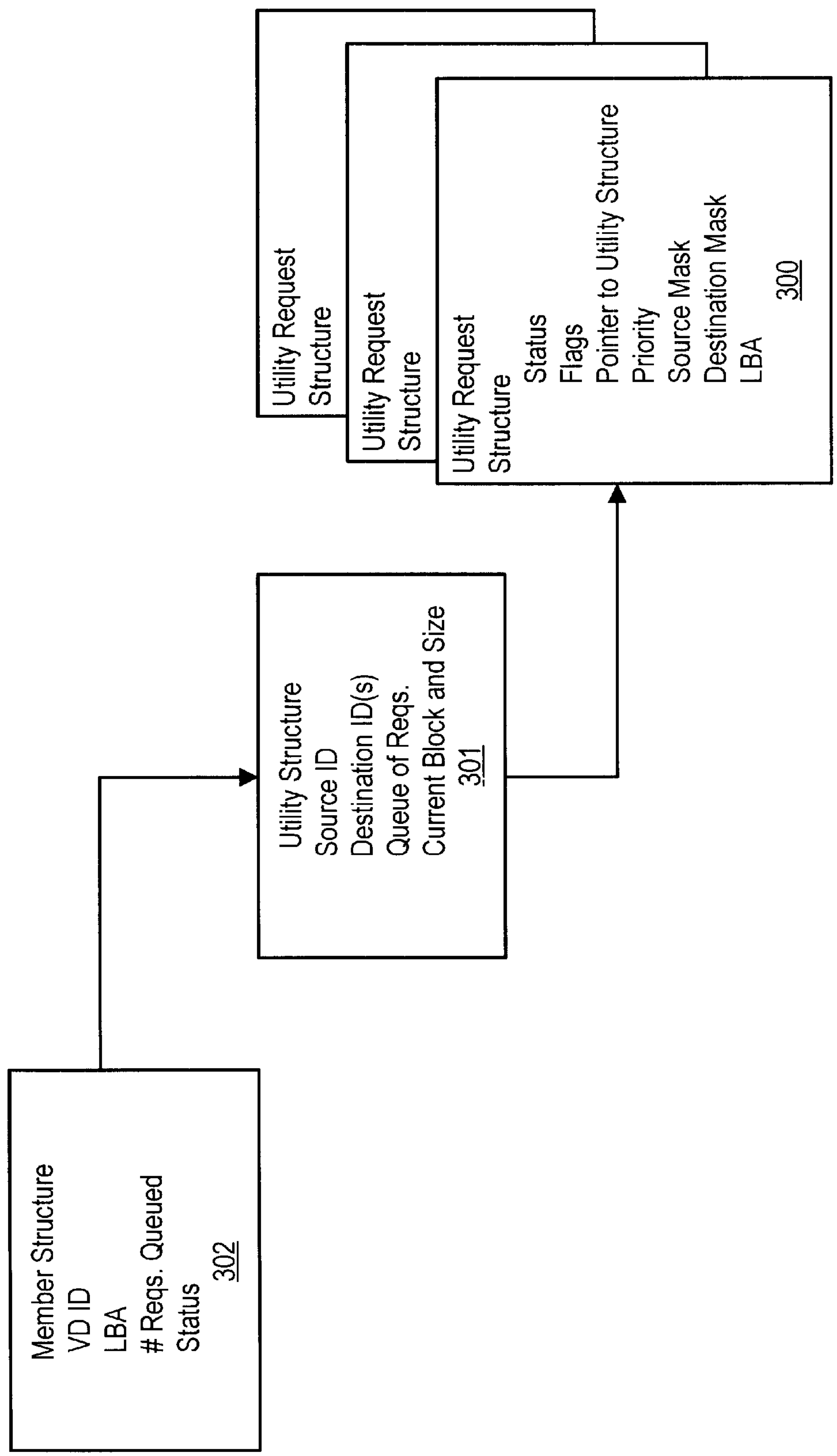
FIG. 5 illustrates data structures used in one example of a driver implementing a hot copy process according to the present invention.

FIG. 5 shows basic data structures utilized in a hot copy process. A first structure 300 is called a UTILITY REQUEST STRUCTURE. A second structure 301 is called a UTILITY STRUCTURE. A third structure 302 is called a MEMBER STRUCTURE. The MEMBER STRUCTURE 302 is set up to identify a particular virtual circuit and its status. The MEMBER STRUCTURE 302 includes parameters, such as a virtual circuit identifier (VD ID), a logical block address (LBA) holding a block number for a block of data currently being handled by the virtual circuit, a count of requests that had been queued for the virtual circuit, and a status parameter.

The UTILITY STRUCTURE 301 holds parameters relevant to a current utility being executed, in this case a hot copy utility. It stores parameters such as the identifier of a source data set SOURCE ID, an identifier or identifiers of a destination storage device or devices for the hot copy process DESTINATION ID(s), a queue of requests to be executed in connection with the utility, and parameters indicating the current block being handled, and its size.

The UTILITY REQUEST STRUCTURE 300 carries a request for the hot copy process, including a variety of parameters concerning the process. It includes for example a parameter indicating the status of the request STATUS, a variety of flags supporting the request, a pointer to a corresponding UTILITY STRUCTURE, a parameter indicating the priority of the request relative to input/output requests from the client processors, a source mask identifying the data set in the source, and a destination mask identifying a location in a destination device into which the hot copy process is to copy the data set. In one embodiment, there are a plurality of destination masks for a single hot copy request. Also shown in FIG. 5, a logical block address (LBA) is kept in the UTILITY REQUEST STRUCTURE, which is also kept in the MEMBER STRUCTURE, for a current block of data within the data set being handled.

To initiate a hot copy process, user input is accepted which causes creation of the UTILITY REQUEST STRUCTURE. The persistent table storage in the storage server is updated with the structure, the status of the source and destination devices, and the virtual circuits associated with the data set are checked, the drivers are set up to initiate the hot copy process, and the status parameters are set in various data structures. The progress of the hot copy process is maintained in the persistent table storage in case of failures. In this case, the hot copy process may be restarted using other resources within the server, using the copy of the status information and data structures that have been stored the persistent table storage. The other drivers in the system, such as RAID monitors and alike are notified of the hot copy process. The request is queued for the MEMBER STRUCTURE.

Once the set up is complete, the input and output processes in support of the hot copy process are initiated. The relative priority of the input and output processes in support of the hot copy process determines the rate of progress for the hot copy process, in the condition that a client processor is executing input and output requests for the same data set. In the preferred system, input and output requests from the client processor are executed first. In the event that a block transfer in support of a hot copy process is being executed, when an input or output request from a client processor is received, then the block transfer is completed as an atomic operation, and then the client processor request is serviced. In alternative systems, other techniques can be used to manage the priority of the processes.

Figure 6:
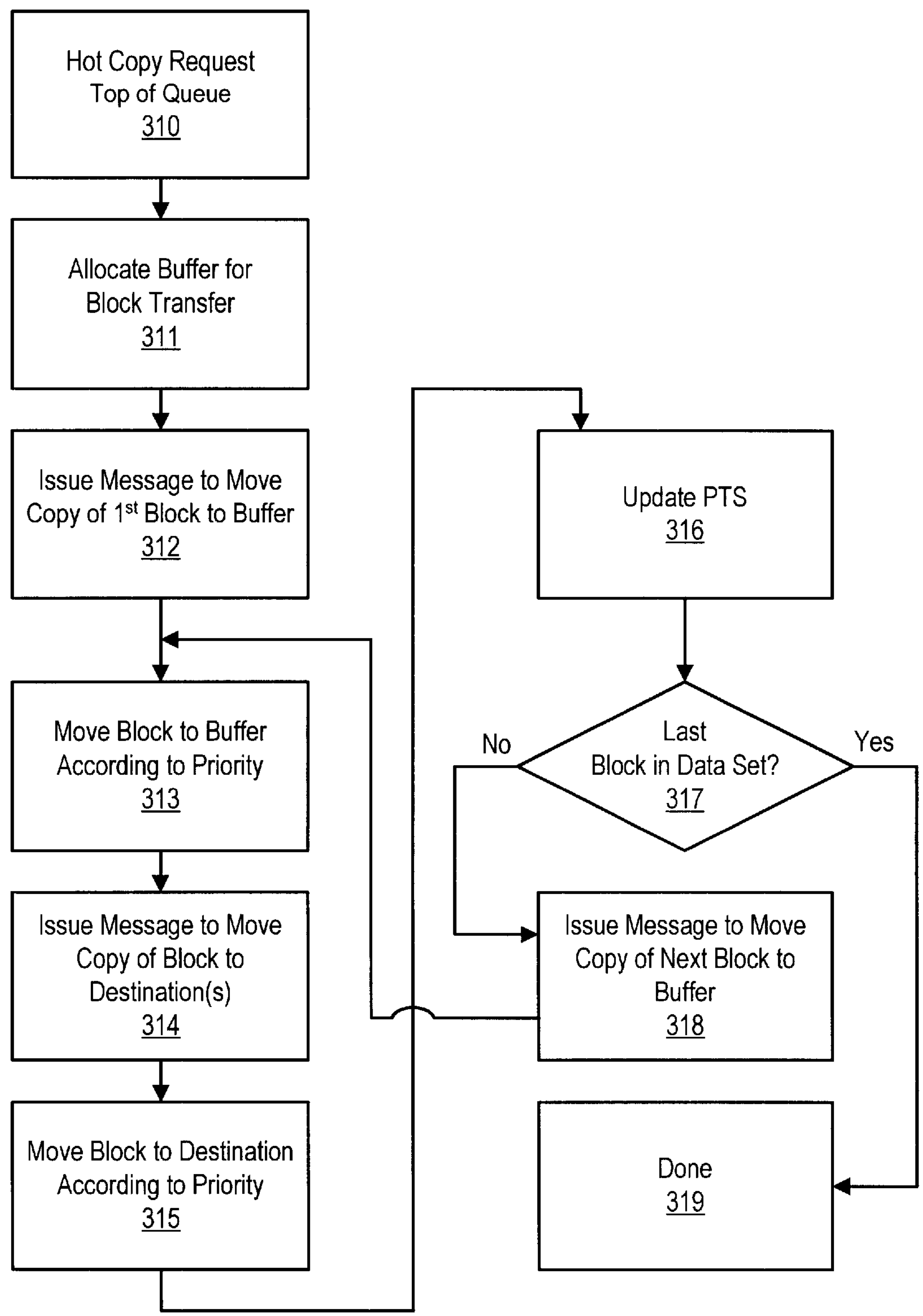
FIG. 6 is a flow chart showing a hot copy process executed by a driver according to the present invention.

The basic process for executing a hot copy is shown in FIG. 6. The process begins with a hot copy request reaching the top of the queue for the member structure (step 310). The process allocates a buffer in the intermediate device to support the block transfer (step 311). A message is issued to move a copy of a first block in the data set to the buffer (step 312). A current block is moved to the buffer according to the priority set for the hot copy process (step 313). The movement of the block is accomplished using appropriate memory lock transactions to control access by multiple processes within the intermediate device. Next, a message is issued to move a copy of the block from the buffer to the destination or destinations (step 314). The block is moved to the destination or destinations according to the priority for the hot copy process (step 315). Once the block is moved, the persistent table store and local data structures supporting the process are updated with status information indicating the progress of the hot copy (step 316). The process determines whether the last block in the data set has been copied (step 317). If not, then a message is issued to move a copy of the next block to the buffer (step 318). The process loops to step 313 to continue moving blocks of the data set into the destination or destinations. If at step 317, it was determined that the last block in the data set had been successfully moved to the destination or destinations, then the process is done (step 319).

According to one embodiment of the present invention, for a hot copy process involving multiple destinations, it is possible that a member or members of the group of destinations being used will fail during the process. In this case, the process can continue with the destination or destinations that continue to operate, updating the appropriate tables in support of the continued process.

Thus, a hot copy feature is used to copy a data set from one individual member that is not yet down to a replacement drive. The data set may include the entire contents of a storage device, or any part of the contents of a storage device. The hot copy feature can be used on RAID arrays of any level, with appropriate status and parameter management.

Hot copy parameters include the priority of process, the source member device, and a destination identifier. A hot copy request contains the source member identifier, the destination member identifier, the copy block size, and the copy frequency or priority. Hot copies are done according to the priority, and one block size at a time. The current block position is kept in array configuration data within data structures as discussed above. The hot copy process is done simultaneously with normal input and output processes. Writes to the drive being hot copied are written to both drives. In this way if the hot copy is aborted or fails, the original source member is still valid. When a hot copy completes, the original source member is removed from the array and designated as not usable by system manager programs. Likewise, in one embodiment, the virtual device supporting the data set is updated to point to the new destination.

Figure 7:
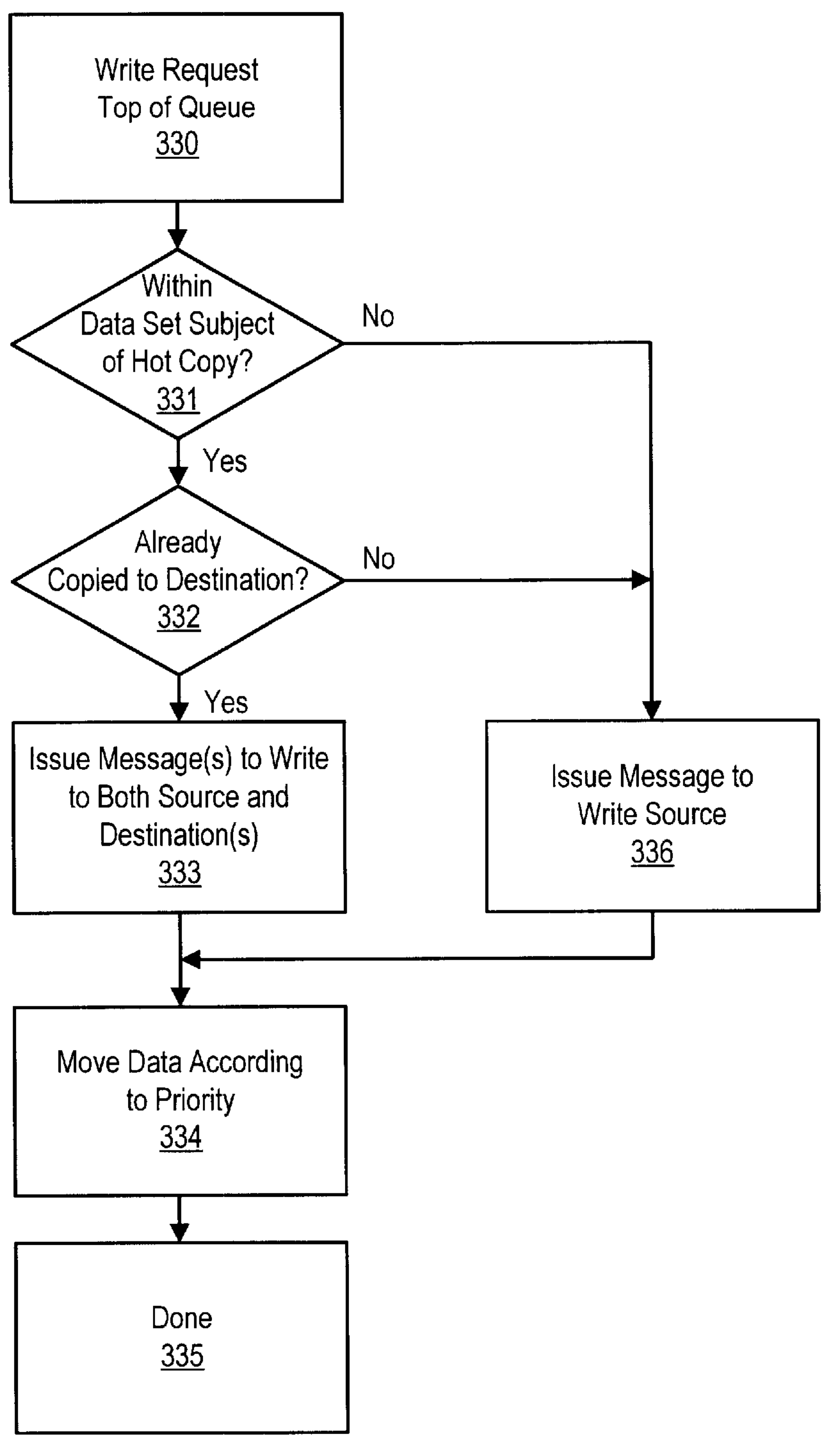
FIG. 7 is a flow chart illustrating handling of a write request during a hot copy process.
Figure 8:
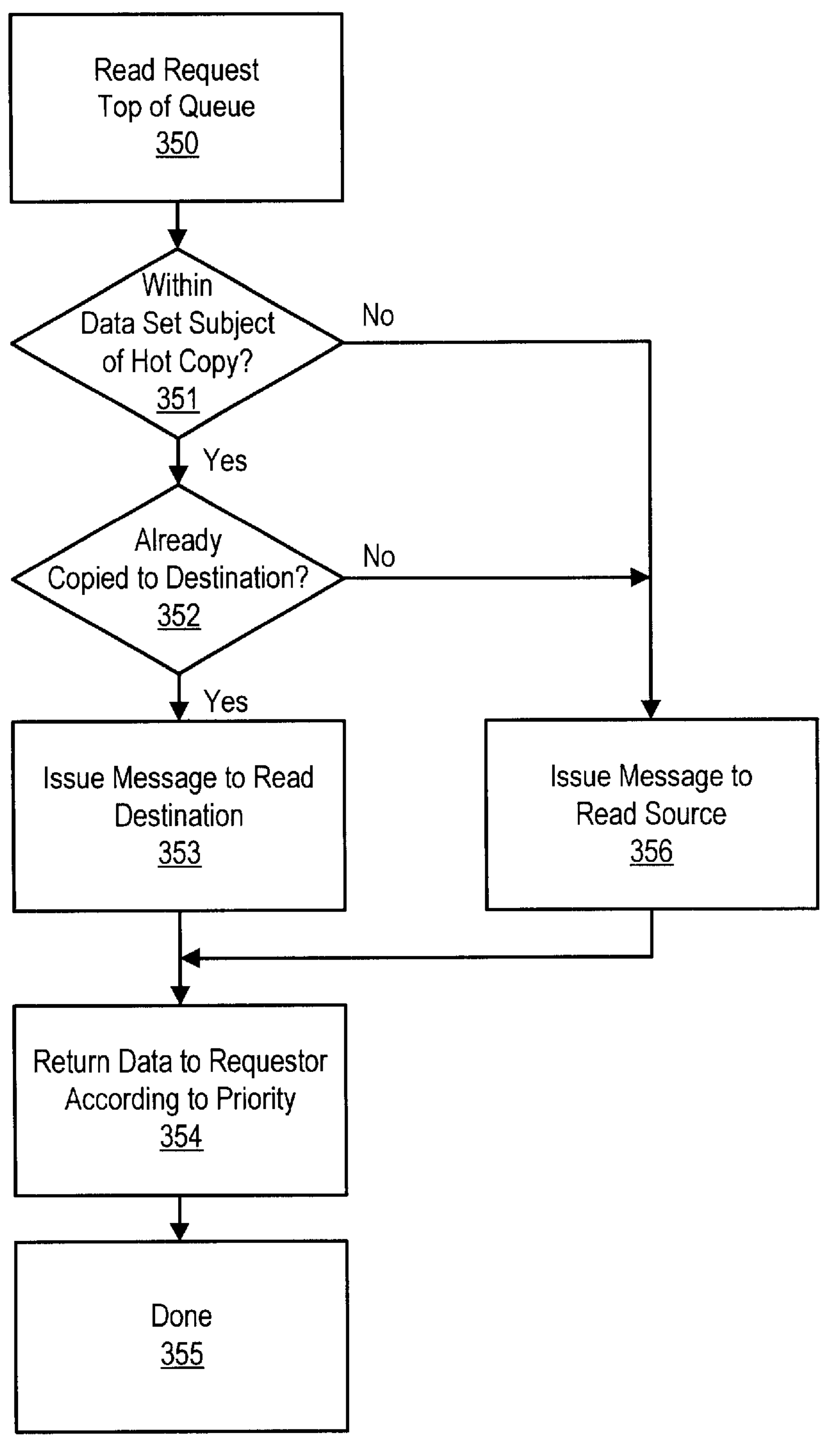
FIG. 8 is a flow chart illustrating handling of a read request during a hot copy process.

FIGS. 7 and 8 illustrate processes executed in the intermediate device to manage data access requests issued by client processors while a hot copy process is being executed. The data access requests may have one of a plurality of types, including read requests and write requests, and variations of the same. Other requests include requests supporting management of the data channel, and the like. In FIG. 7, one process for handling a write request is illustrated.

When a write requests reaches the top of the queue, the process begins (step 330). The process determines whether the write request identifies a location within the data set subject of a current hot copy process (step 331). If it is within the data set being hot copied, then the process determines whether the block within which the write request is directed has already been copied to the destination (step 332). If it has been copied, then a message is issued to write both to the storage device in which the data set was originally held and to the destination storage device or devices (step 333). Next the data is moved according to the priority for the input and output request (step 334), and the process is done (step 335).

If at step 331, the request was not within the data set, then the message is issued to execute the write to the source of the data set (step 336). The process flow moves to step 334 at this point. Likewise, if at step 332, it is found that the location subject of the write had not already been copied, then the message is issued to write to the source device (step 336).

FIG. 8 illustrates the handling of a read request that occurs during a hot copy. The process begins when the read request reaches the top of the queue for the virtual device (step 350). The process first determines whether the read falls within the data set subject of the hot copy (step 351). If the read falls within the data set, then the process determines whether the read falls within a block already copied to the destination or destinations (step 352). If the read is found within a block already copied to the destination, then a message issued to read the data from the new location (step 353). In an alternative system, the read may be executed from the source device, or from both the source and the destination devices, depending on the reliability, speed, and other factors affecting management of the data traffic within the system. After step 353, the data is returned to the requestor according to the priority for the client processor data access request (step 354). Then, the process is done (step 355).

If at step 351, it is determined that the read request is not within the data set subject of the hot copy, then the message is issued to read the source device (step 356). Likewise, if at step 352, it is determined that the read request addresses a block not yet copied to the destination, then the message is issued to read the data from the source device (step 356). After step 356, the process returns to step 354.

In the event that a write request to data within a particular block occurs while the block is in the process of moving through the intermediate device buffer, then data lock algorithms are used to manage handling of the requests. Thus for example, if a logical block is locked in support of the hot copy process while a write request is received, then the client processor will receive notification that the write request was refused because the data was locked. In alternative systems supporting a higher priority for the client processor, the read or write request may be allowed to continue, while the block held in the buffer in support of the hot copy is deleted, and the status of the hot copy is reset to indicate that the block has not been moved. A variety of other data lock algorithms could be utilized as needed for particular implementations.

Figures 9, 10:
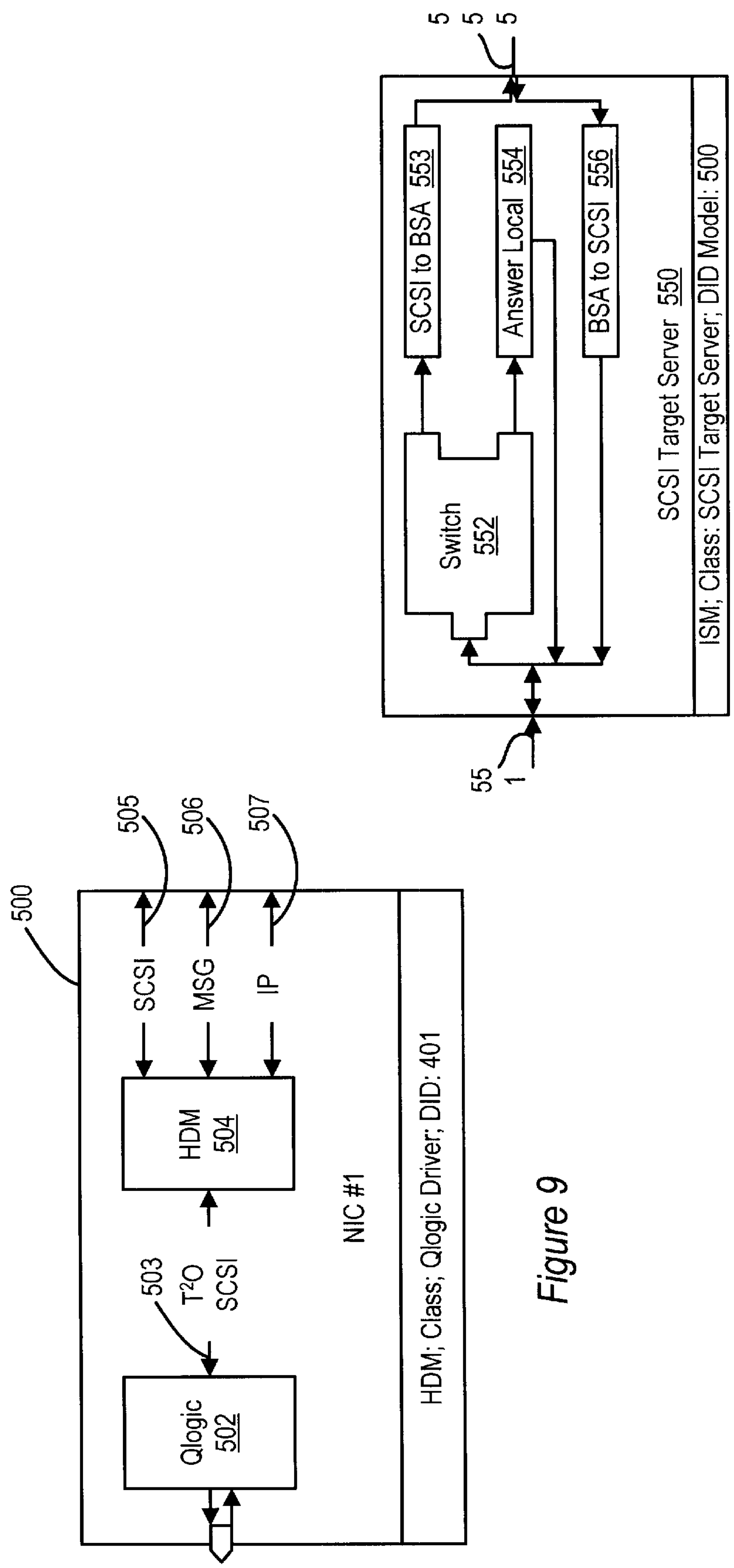
FIG. 9 is a simplified diagram of a hardware driver module for a Fibre Channel interface for use in the system of the present invention.
FIG. 10 is a simplified diagram of a target server internal service module according to the present invention, having a local answer capability.
Figure 11:
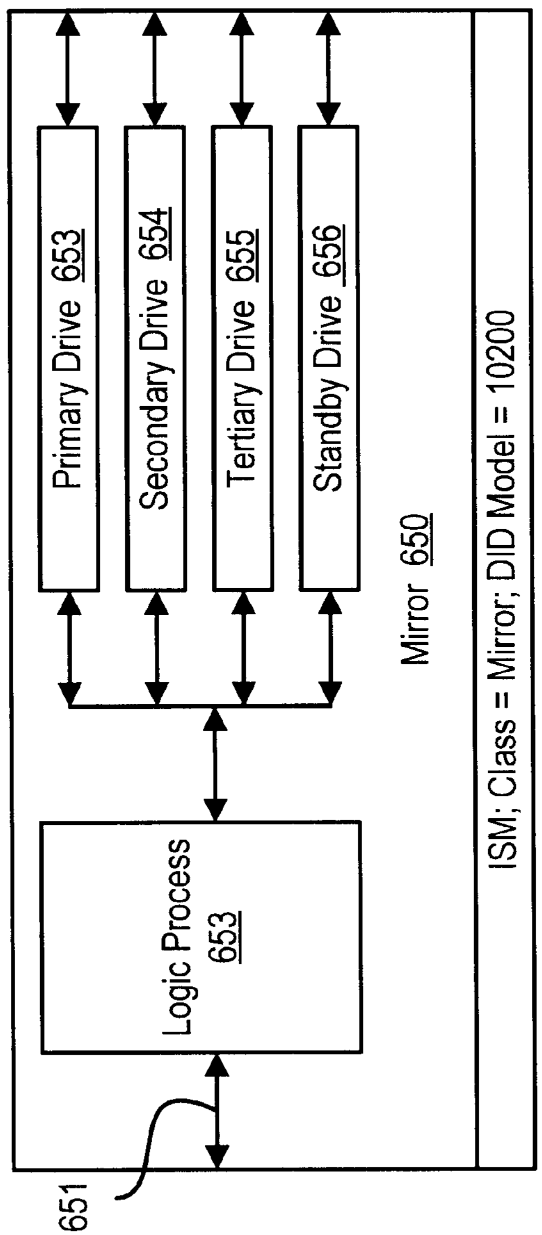
FIG. 11 is a diagram of an internal service module implementing a disk mirror.
Figure 12:
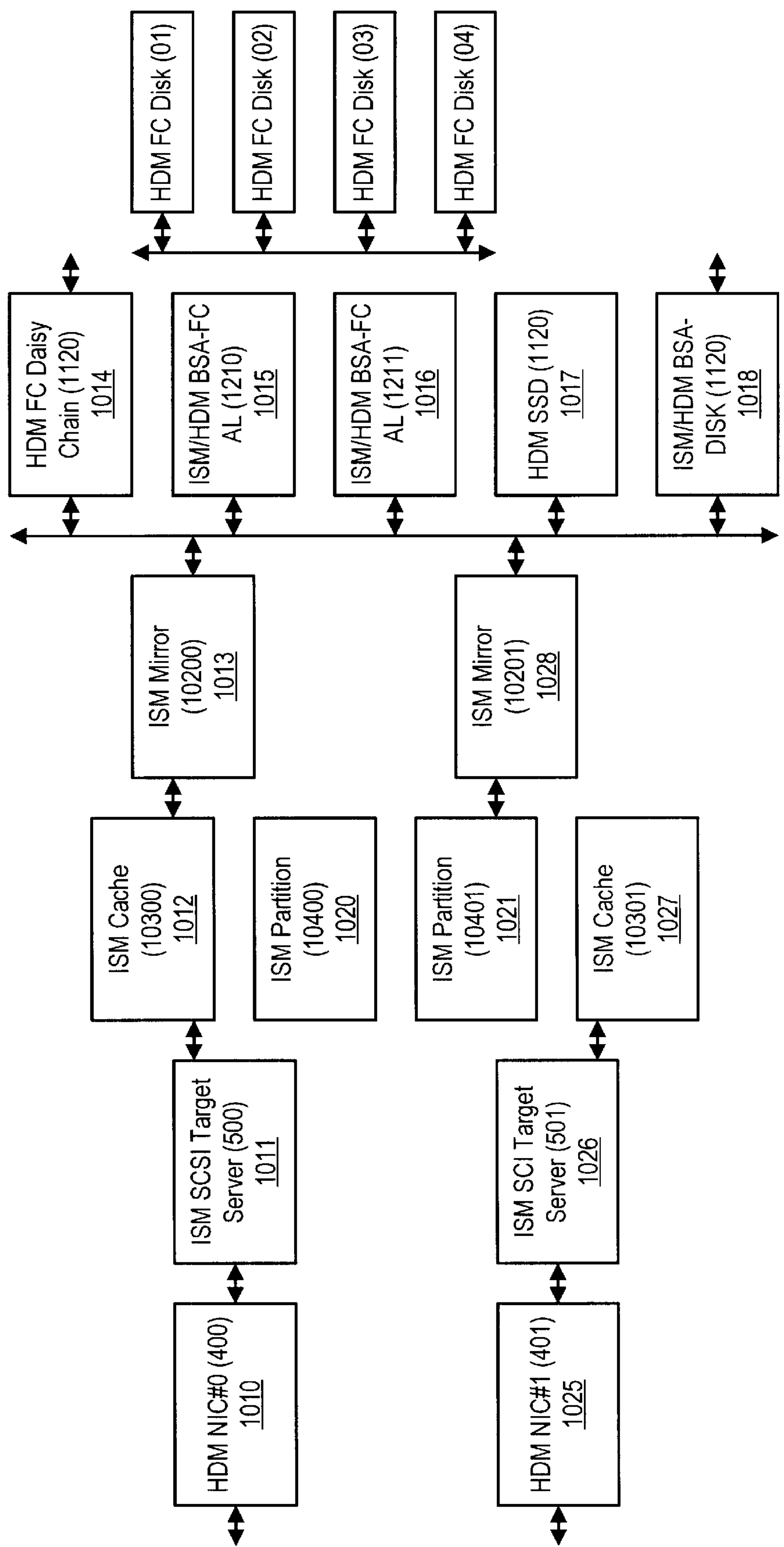
FIG. 12 illustrates a virtual circuit configuration according to the present invention.

FIG. 9 illustrates a hardware driver module HDM and FIGS. 10 and 11 illustrate internal, intermediate service modules (ISMs) according to the preferred architecture of the present invention. FIG. 12 provides a simplified diagram of a set of driver modules which have been configured into data paths acting as virtual circuits.

FIG. 9 illustrates a network interface card 500 having a HDM 504. The card 500 has a physical interface 501 to a Fibre Channel network. A network interface chip 502, in this example a Qlogic device, such as a ISP 2200A provided by Qlogic Corporation of Costa Mesa, Calif., is coupled to the physical interface 501. The network interface chip 502 generates communication represented by line 503, which is processed in the HDM 504. The HDM 504 conditions the communications for use by other driver modules in the system. Thus, communication represented by line 505 has an SCSI format. Communication represented by line 506 has a message format such as a BSA format. Communication represented by line 507 has an Internet Protocol (IP) format. The HDM is an instance of a driver class labeled “QLogic driver” in the diagram, and given device identifier DID 401 in this example. The physical interface is identified as NIC #1.

FIGS. 10–11 illustrate a variety of ISM examples according to the present invention, which can be configured into data paths.

FIG. 10 shows a SCSI target server 550, which is one example of a protocol server module according to the present invention. Similar protocol server modules can be implemented for any particular storage channel or network protocol implemented by users of the data managed through the storage server of the present invention. The target server 550 has a message interface 551 which receives incoming messages from an HDM, such as the HDM of FIG. 9, coupled to a communication interface adapted for connection with a user. In this example, the messages on interface 551 have an SCSI format. In other examples, the messages may already have the BSA architecture, or some other architecture which is suitable for the protocol on the communication interface being served. The server 550 includes a switch function 550 which translates incoming messages to a SCSI to BSA translator 553, or to an answer local function 554. Typically messages are forwarded by the translator 553 as outgoing messages on line 555. Incoming messages on line 555 are supplied to translator 556 which translates the incoming BSA messages to the SCSI format used on line 551.

In many instances, the SCSI target device can respond using the local answer service 554 to the SCSI message without routing the message further. Many status messages that do not relate to reading or writing from the storage itself are handled by the local answer service 554.

The target server 550 in this example is an instance of a class SCSI target server, and given a device identifier 500. One function of the protocol server, such as the SCSI target server 550, is to identify the storage extent which is subject of a storage transaction on the associated interface. The storage extent is mapped to a virtual circuit using the configurable logic in the storage server as described in more detail below.

FIG. 11 illustrates an ISM 650 which performs a mirror management data path task. The ISM 650 includes an interface 651 which is connected to the internal communication channels on the device. Logic processes 652 receive the incoming communications and data and manage a mirroring function. The logic 652 communicates with a plurality of drive interfaces including primary drive 653, secondary drive 654, tertiary drive 655, and standby drive 656. Although 3-way mirroring is shown in the diagram, any number of mirror paths may be implemented for "n-way" mirrors using virtual circuits. Although the drive interfaces in FIG. 9 are labeled with the term "drive," other types of storage devices can be used in the mirroring functions. The drive interfaces 653–656 communicate using the internal communication channels with the HDM modules associated with the target storage devices used in the mirroring function, or with other ISM modules as suits the particular virtual circuit. In this example, the mirror ISM 650 is implemented as an instance of a class "mirror," and given a device identifier 10200. In one embodiment, the hot copy resources of FIGS. 5–8 are coupled with a mirror management ISM.

FIG. 12 provides a heuristic diagram of redundant virtual circuits implemented by data paths including a plurality of driver modules according to present invention. Virtual circuits include an external interface for communication with a user of the data, a protocol translator for translating communications with the user into the communication format of the driver modules, and a storage object which includes a communication interface to a storage device. Storage operators which perform data path tasks can exist between the translator and the storage object. The optimal ordering of the driver modules acting as storage operators, such as cache, mirror, partition, etc., is done by the system designer using the configurable logic provided by the storage server.

In the example illustrated in FIG. 12, the external interface is provided by the NIC #0, and its associated HDM is represented by block 1010. The protocol translator is provided by the SCSI target server ISM 1011. A cache function is provided by the ISM 1012. A mirror function is provided by the ISM 1013. The storage objects are accessed from the mirror function 1013, and consist of a set of physical storage interfaces selected in this example from the Fibre Channel basic daisy chain interface and its associated HDM represented by block 1014 or an external LUN interface, the disk drives in the Fibre Channel arbitrated loop accessed through the ISM/HDM pair represented by block 1015 and the redundant block 1016, the solid state storage device and its associated HDM represented by block 1017, and the interface to an external disk drive and its associated ISM/HDM pair represented by block 1018. Separate HDM modules on each of the Fibre Channels interfaces to disks (01), (02), (03), and (04) manage the communication across the Fibre Channel arbitrated loops with the interfaces 1015 and 1016.

In the embodiment shown, the mirror module 1013 accesses disks (01), (02), and (04) as the primary, secondary and standby drives, respectively, for the mirror functions. Although the mirror module shown in FIG. 9 includes the tertiary drive interface, this tertiary drive is not used in the example system.

Also shown in the diagram are partition ISM modules 1020 and 1021, which are not connected with the data paths of the virtual circuit shown. These blocks are present to illustrate that using the virtual circuit structure, new modules, like partitioning, may be added to the path by simply configuring the storage server.

A redundant data path is implemented using the interface NIC #1 and its associated HDM represented by block 1025, the SCSI target server ISM represented by block 1026, the cache ISM represented by block 1027, and the mirror ISM represented by block 1028. Redundancy in the data storage devices is accomplished using the mirror function. The redundant driver modules are distributed in a preferred embodiment on separate IOPs within the storage server.

Figures 13, 14:
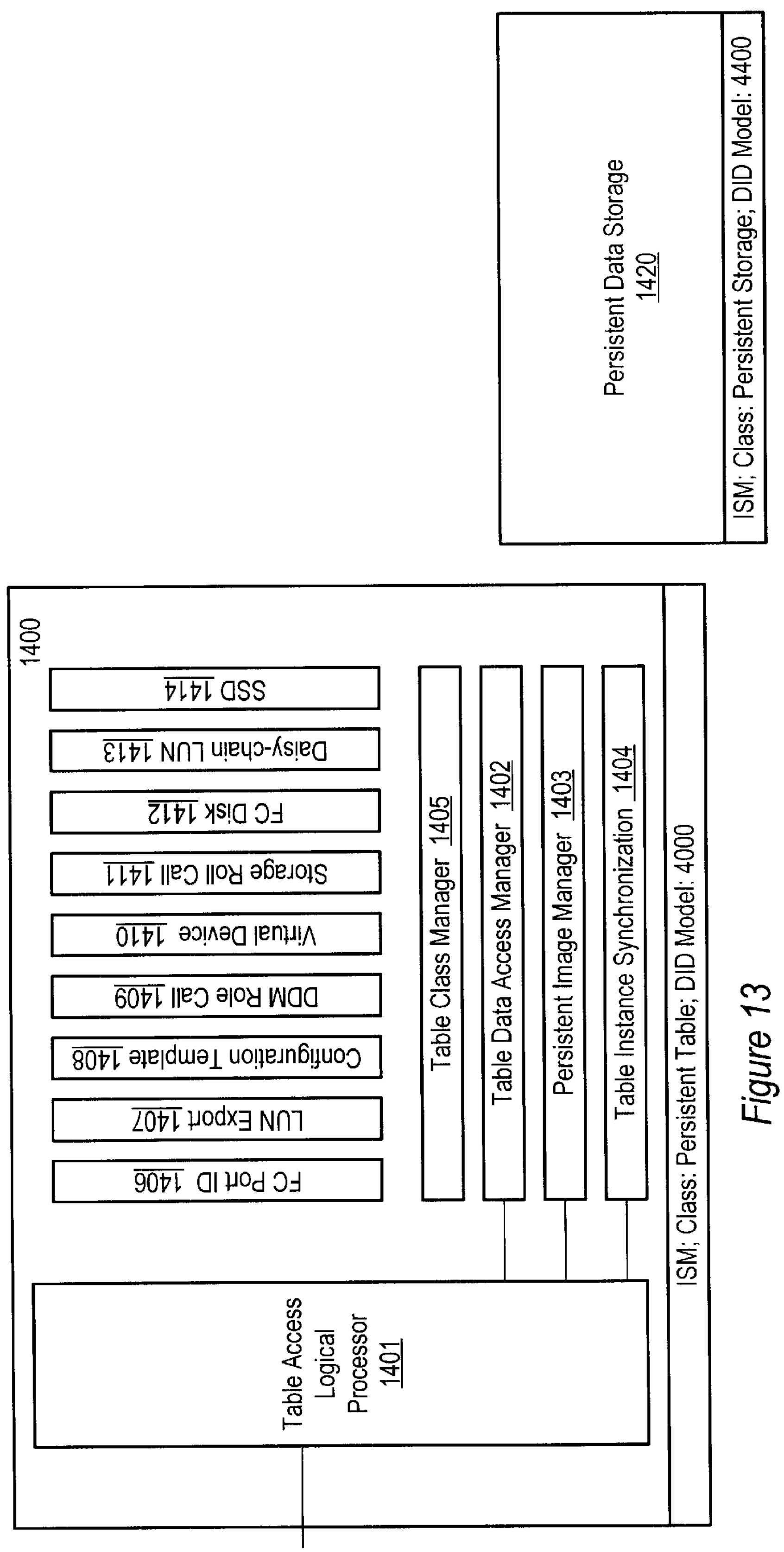
FIG. 13 is a diagram of an internal service module implementing a persistent table store manager according to the present invention.
FIG. 14 illustrates schematically a persistent storage hardware driver module according to the present invention.

As illustrated in FIG. 12, each of the driver modules includes a unique driver identifier which is shown within the parentheses in the blocks of FIG. 13. The unique device identifiers are used to support the configuration logic based on tables in a configuration database managed by the storage server, and controlled by local configurable logic in the storage server.

In the preferred system, the configuration tables are managed by a persistent table driver, such as that illustrated in FIGS. 13 and 14. Referring back to FIG. 2, the ISAN server 102A stores management and routing information in tables such as the tables 116. The tables 116 can be accessed through the management interface 120. The tables 116 will typically be stored in persistent memory such as a non-volatile memory. The tables 116 can be maintained redundantly to provide fail safe support.

FIG. 13 illustrates a persistent table module 1400 which is implemented as an instance of a class "persistent table," following the basic architecture of the driver module structure. The persistent table module 1400 includes a table access logical processor 1401, and a variety of supporting functions including table data access manager 1402, persistent image manager 1403, and persistent table instance synchronization module 1404. The table data access manager 1402 is coupled with a table class manager 1405 in this embodiment. The table class manager manages a plurality of configuration tables including a Fibre Channel port ID table 1406, a LUN export table 1407, a configuration template table 1408, a DDM roll call table 1409, a virtual device table 1410, a storage roll call table 1411, a Fibre Channel disk roll call table 1412, an external LUN table 1413 and a solid state storage table 1414. The particular configuration of the set of tables managed by the persistent table module 1400 can be changed to suit the particular implementation, and optimized for certain classes of devices.

Figure 15:
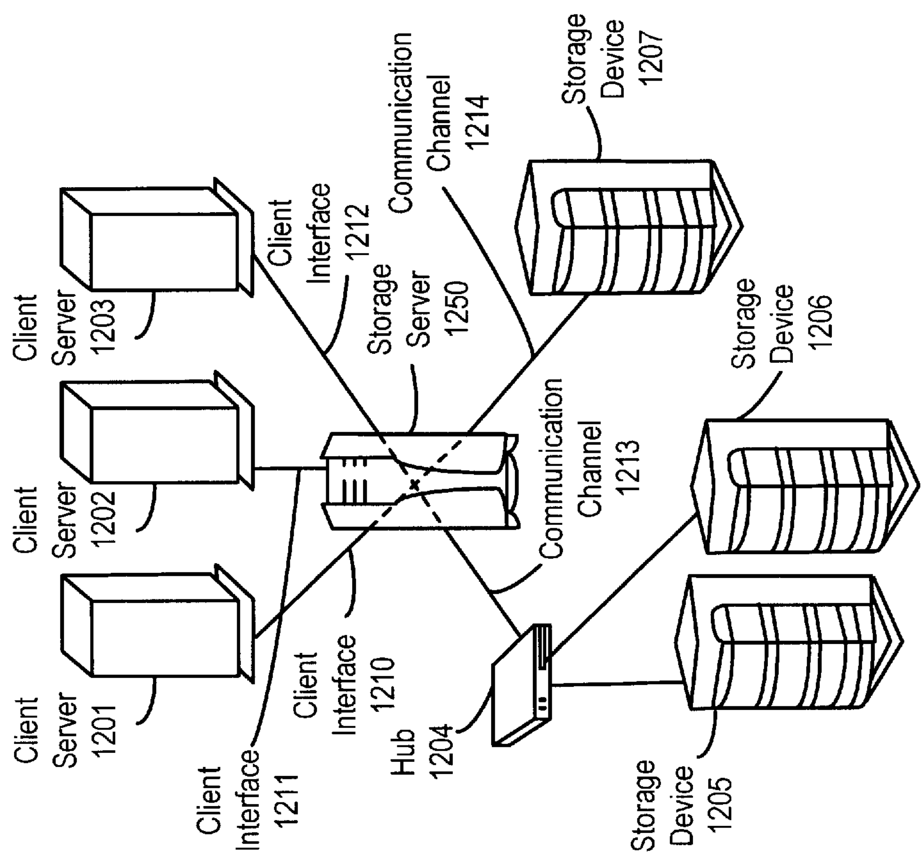
FIG. 15 illustrates a storage area network having a storage server according to the present invention configured as a storage router or a storage director.

The persistent image manager 1403 and the table instance synchronization manager 1404 communicate with persistent data storage driver 1420 as illustrated in FIG. 15, and a second persistent storage driver not shown. The persistent data storage driver 1420 is implemented as an HDM, which is an instance of a class "persistent storage," and is given a device identifier following the model of the driver modules described above. In the preferred system, the persistent data storage HDM 1420 communicates with the solid state storage device in the storage server, and provides fast access to the data used in the virtual circuits.

The persistent data storage maintains a wide variety configuration information for the system. The DDM roll call table 1409 includes a list of all the instances of the device driver modules, and their unique device IDs. The storage roll call table 1411 includes a list of all the active storage devices detected by the storage server. The roll call tables can be utilized by the virtual device table 1410 and by the configuration tools to create virtual circuits. The LUN export table 1407 provides a technique for mapping the identified storage extents within a storage channel transaction to virtual circuits. The external LUN table 1413 identifies logical units of storage which are maintained in other storage servers connected through the external storage interface on the storage server.

Two primary tables support the exporting of storage to clients and the storage routing functionality of the ISAN server 102A. These tables are the export table 1407 and the virtual device configuration table 1410.

The Export Table 1407

The export table 1407 maps addressing information received with a storage transaction to a virtual circuit or to a storage option. In the case of SCSI-3 over a fibre channel interface, the addressing information used is the initiator ID, the target LUN, and the target address.

It is not necessary to use all of this information to resolve each request because many LUNs can be shared across all initiators, or clients, and most LUNs will use the target address, e.g., the offset on the storage device, for addressing within the virtual circuit rather than for selecting different virtual circuits. Thus in a typical embodiment, the export table 1407 is organized as shown in Table 1.

TABLE 1

| Protocol | Protocol Specific Addressing (LUN) | Initiator Specific? if yes, ID | First virtual device in circuit | Primary connection owner |
|---|---|---|---|---|
| SCSI | 0 | No | 11 | NIC 0 |
| SCSI | 1 | Yes, ID = 6 | 30 | NIC 0 |
| SCSI | 1 | Yes, ID = 5 | 60 | NIC 1 |
| SCSI | 2 | No | 12 | NIC 0 |
| TCP/IP | Port 2000 | No | 70 | NIC 0 |

The export table 1407 may include other columns such as the current state of the virtual circuit, the capacity of the virtual circuit, and other information. In one embodiment, the export table 1407 lists the entire virtual circuit in a column of the export table.

Table 1 shows that protocol specific addressing information can be used to route the request to the appropriate virtual circuit. Therefore, only TCP sessions using port 2000 as the identifier of the target extent of storage would be routed to the virtual circuit starting with the virtual device having identifier 70.

Table 1 shows that a single LUN for a protocol can be connected to different devices depending on the initiator of the storage transaction. In this example, LUN 1 is mapped to different virtual circuits based on the initiator ID. Also, virtual circuits can be mapped based on other types of identifiers, such as the World Wide Name (WWN).

An example export table has the following structure:

```
#define EXPORT_TABLE "Export_Table"
struct ExportTable Entry {
    rowID          ridThisRow;              // rowID of this table row.
    U32            version;                 // Version of Export Table record.
    U32            size;                    // Size of Export Table record in bytes.
    CTProtocolType ProtocolType;            // FCP, IP, other
    U32            CircuitNumber;           // LUN or other
    VDN            vdNext;                  // First Virtual Device number in the Path
    VDN            vdLegacyBsa;             // Virtual Device number of the legacy BSA
    VDN            vdLegacyScsi;            // Virtual Device number of the legacy SCSI
    U32            ExportedLUN;             // LUN number exported
    U32            InitiatorId;             // Host ID
    U32            TargetId                 // our ID
    U32            FCInstance;              // FC Loop number
    String32       SerialNumber;            // Use a string array for Serial Number
    long long      Capacity;                // Capacity of this Virtual Circuit
    U32            FailState;
    U32            PrimaryFCTargetOwner;
    U32            SecondaryFCTargetOwner;
    CTReadyState   ReadyState;              // Current state
    CTReadyState   DesiredReadyState;       // Desired Ready State
    String16       WWNName;                 // World wide Name (64 or 128-bit IEEE registered)
    String32       Name;                    // Virtual Circuit Name
#endif
```

The Virtual Device Configuration Table

The virtual device configuration table connects virtual devices with the device drivers that support the virtual device. The virtual devices are designed to support a redundant design. Therefore the table for virtual device configurations maps virtual device numbers to device modules. In one embodiment, a table such as Table 2 is used to map virtual devices to supporting device drivers. FIG. 12 illustrates the virtual circuit implemented by Table 2, starting with virtual device 12.

TABLE 2

| Virtual Device | Primary | Alternates | Parameters | Status | Class |
|---|---|---|---|---|---|
| 1 | 4000 | 4001 | N/A | Primary | Persistent Table |
| 10 | 1210 | 1211 | SO(00) | Alternate | FC Disk |
| 11 | 500 | 501 | VD(10) | Primary | SCSI Target |
| 12 | 500 | 501 | VD(13) | Primary | SCSI Target |
| 13 | 10300 | 10301 | VD(14) | Primary | Cache |
| 14 | 10200 | 10201 | VD(15, 16, null, 17) | Primary | Mirror |
| 15 | 1210 | 1211 | SO (02) | Primary | FC Disk |
| 16 | 1210 | 1211 | SO (03) | Primary | FC Disk |
| 17 | 1210 | 1211 | SO (04) | Primary | FC Disk |

As Table 2 shows, for each virtual device, information is provided about primary and alternate driver modules supporting the virtual device. For example, in the second entry in Table 2, a fibre channel disk drive is mapped to virtual device (VD) 10.

The virtual device comprises the one or more software or hardware modules for supporting the virtual device. The parameters column is used to provide initialization information. In the case of VD 10, the parameter is SO(00) which stands for storage option 0. Each device driver module class has class specific parameters. Storage option drivers use parameters specifying a particular storage unit. Intermediate driver classes such as the mirror driver and the cache driver use parameters that specify the next virtual devices in the virtual circuit. This format allows a single device driver module to support multiple devices based on the parameter setting. Notice that in Table 2, the device driver 1210 is being used by virtual devices 10, 15, 16, and 17, but each specifies a different parameter to the driver.

The status column indicates the status of the software or hardware modules supporting the virtual device. For example, in the first entry in Table 2, the status is "primary", which means that the primary device driver, 4000 here, is being used. In the second entry in Table 2, the status is "alternate", which means that the primary device driver has failed or is not responding properly. In that case, the alternate driver, 1211 for the second entry in Table 2, is used. If a device has more than one alternate, the status column will indicate the driver being used.

EXAMPLE

For example, consider a storage transaction that comes over one of the connection options 130 to the ISAN server 102A using the SCSI protocol and designating LUN 2 in the addressing information. Assume that the ISAN server 102A is configured as shown in Tables 1 and 2 for this example.

The connection option such as the network interface 146 over which the storage transaction is received is coupled to a hardware device driver. The hardware device driver receives the storage transaction and depending on the protocol, dispatches it to an appropriate virtual device for handling that protocol.

For example, SCSI storage transactions are sent to a device driver in the SCSI target class. Similarly, IP storage transactions are sent to a device driver in the IP target class. Here, the storage transaction was made using the SCSI communication protocol so it is routed to a SCSI target device driver (DID 500).

The SCSI target device driver further analyzes the request. The first part of the analysis is to determine which virtual circuit to map the request to. This determination can be made using the information in the export table. In this example, Table 1, indicates that a request using the SCSI protocol specifying LUN 2 should be routed to the virtual circuit starting with the virtual device 12. In one embodiment, all of the SCSI target requests are routed to the same SCSI target driver for a single interface. In this embodiment, the parameter information for the target VD 12 is used to control the behavior of the SCSI target device rather than routing the message to a second virtual device for a SCSI target.

The SCSI target device here, driver number 500, translates the SCSI message into an internal format. One such format is based on the 20 block storage architecture (BSA) format. This format is device and protocol neutral and can be used by the intermediate device drivers. Once the request is in internal format, it is sent to the next virtual device in the virtual circuit as indicated by the parameter field, here, the parameter is VD(13) or virtual device 13.

The message is routed to the VD 13, which provides redundant caching drivers, here, the drivers numbered 10300 and 10301. The caching driver uses a memory to cache storage transactions. Based on the caching algorithm being used by the driver, the driver will route storage transactions to the next virtual device in the virtual circuit at appropriate intervals. Here that next device is indicated by the parameter VD(14), or virtual device 14.

In the internal format, the message is routed to VD 14. The virtual device 14 includes redundant mirroring drivers. In this case, the drivers 10200 and 10201 are used. The mirroring drivers implement a mirroring algorithm for maintaining a mirrored image of storage on multiple volumes. This mirroring driver supports a primary, secondary and tertiary store as well as a standby store. Other mirroring drivers may support different algorithms. This mirroring driver also supports the coupling of a new store that is steadily brought into synchronicity with an existing store. Based on the mirroring algorithm being used by the driver and the status of the mirrored stores, the driver will route storage transactions to the appropriate virtual devices in the virtual circuit. Assuming that both the primary and alternate stores are functioning, the mirror driver will route this request to the primary and secondary stores only according to the parameter VD (15, 16, null, 17) or virtual devices 15 and 16. The null in the parameter list indicates that no tertiary drive is currently being used for this virtual device.

The mirroring driver may route the storage transaction messages in serial or in parallel to the two devices. In this example, the messaging to virtual device 15 will be considered although the example can also be extended to the second store, virtual device 16. Virtual device 15 includes redundant drivers for controlling a fibre channel drive. The drivers translate the internal format into a format used by the drives, e.g., BSA to SCSI. The drivers also provide the addressing information to the drive. Here, the parameter SO(02) is used to select a storage option, here the fibre channel drive number 2.

Accordingly, within the storage platform, hardware functions (such as disk or flash storage) and software functions (such as RAID stripes or Mirrors) are all accessed via software drivers most commonly referred to as devices.

These devices are paired up (with each member of the pair preferably running a separate board for redundancy) and called Virtual Devices. These Virtual Devices are then chained together into various configurations. For instance, a mirror device can be chained to two or three disk devices. Through this type of configuration Virtual Device chains are constructed. These Virtual Device chains can be added to as long as they are being configured into some BSA-type device that can itself be used within yet another configuration.

Virtual Device chains are connected to a FCP/SCSI Target Server device and mapped in the FCP Target Driver's LUN export tables for "export" (i.e., to be accessible via the FCP protocol from the outside world). At that point the Virtual Device chain with a SCSI Target Server Device at its head is called a Virtual Circuit.

The Virtual Circuit Manager software responsible for creating Virtual Circuits puts the SCSI Target Server "head" onto a Virtual Device chain and then exports the Virtual Circuit by updating the FCP Target's Export Tables. The software also supports delete, quiesce and fail-over operations.

Virtual Circuit Manager software is also responsible for maintaining the Virtual Circuit Tables (VCTs) that list in a single place all the Virtual Devices in each Virtual Circuit. This information is needed to implement many system actions such as failover, hot-swap and shutdown.

When it is initialized, the Virtual Circuit Manager software defines the VCT itself in the persistent table store. Note that this is harmless if the VCT has already been defined. The Virtual Circuit Manager software also listens for insertions, deletions and any modifications to the VCT.

In order to create a new Virtual Circuit, the information necessary to instantiate a SCSI Target Server and to map and export the new LUN must be placed into a record in the VCT. The Virtual Circuit Manager listens for insertions into the VCT and upon receiving a listen reply will perform the following actions:

1. Attempt to validate the information in the newly inserted record. If the record contains invalid information, its status field is set to indicate the error and no further action is taken.
2. Create a new SCSI Target Server device for the LUN of the Virtual Circuit specified by the newly inserted record.
3. Set the status in the new record to "Instantiated".
4. The storage assigned to the Virtual Circuit will be flagged as used in a Storage Roll Call Table.
5. The Export Table will be updated to dispatch the LUN to the new SCSI Target Server.

When a record in the Virtual Circuit is deleted, the Virtual Circuit Manager will perform the following actions:

1. Quiesce the Virtual Circuit if it is not already and mark it as Quiesced.
2. Remove the Virtual Circuit's dispatch data from the Export Table.
3. Mark the Roll Call Record referenced from the Virtual Circuit Record as unused.
4. DeInstantiate the SCSI Target server associated with the Virtual Circuit.

The Virtual Circuit Manager also listens for modifications to the "Exported" field in the VCT. If the "Exported" field in any record in the VCT is set to True, then the Virtual Circuit Manager will perform the following actions;

1. Export the virtual circuit by making the necessary modifications to the FCP Target's Export Table.
2. If there is any error encountered during the Export Operation, the status field in the VC Record will be set and the "Exported" field will be left in a correct state. If the Virtual Circuit was not exported, the Exported Flag will be set to False.

The Virtual Circuit Manager listens for modifications to the "Quiesced" field in the Virtual Circuit Table. If the "Quiesced" field in any record in the VCT is set to True, then the Virtual Circuit Manager will perform the following actions:

1. If the VC is currently exported, it will be unexported and its "Exported" flag will be set to False.
2. All of the Virtual Devices in the Virtual Circuit will be sent Quiesce Messages.
3. If there is any error encountered during the Quiesce Operation, the status field in the VC record will be set and the "Quiesced" field will be left in a correct state, i.e., if the Virtual Circuit was not quiesced, the Quiesced Flag will be set to False.

FIG. 15 illustrates a storage area network utilizing a storage server 1200 according to the present invention. The storage server 1200 in the network has client interfaces 1210, 1211, 1212 coupled to client servers 1201, 1202, and 1203 respectively. Storage interfaces 1213 and 1214 are coupled to communication channels to storage devices 1205, 1206, 1207. The communication channel 1213 in this example is connected through a hub 1204 to the devices 1205 and 1206. In operation, the client interfaces operate according to a protocol by which the client servers requests storage transactions by commands which carry an identifier of an initiator, a logical extent such as a LUN number, and an identifier of a target device. The storage server 1200 maps in the requested transaction to a virtual device, which in turn allocates physical storage for use in the transaction from among the physical storage devices. The storage server 1200 also includes resources that emulate the target physical device identified in the request. The storage server 1200 is able to direct storage transactions using local configuration data, and simplify the management of storage for the client servers.

Figure 16:
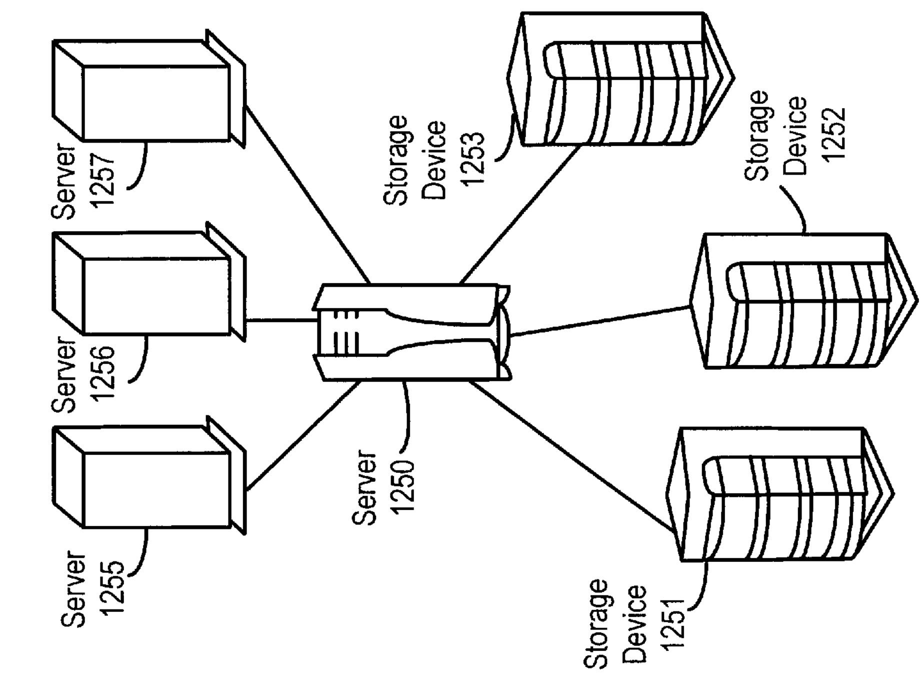
FIG. 16 illustrates a storage area network in an alternative configuration having a storage server according to present mention configured as a storage router or a storage director in a heterogeneous network.

FIG. 16 illustrates another embodiment of a storage area network. In FIG. 16, a server 1250 which includes storage director logic and cache memory as discussed above, is coupled to client servers on a variety of different platforms, including a Hewlett-Packard server 1255, a Sun server 1256, and a SGI server 1257, each of which may be executing different protocols management of storage transactions. A plurality of physical storage devices is also coupled to the server 1250 and managed by the storage director according to the virtual device architecture described above. The plurality of physical storage devices in this example include storage on a Hewlett-Packard platform 1251, storage on a Sun platform 1252 and a storage upon a EMC platform 1253. Thus, the server, including storage director logic, allows creation of a shared storage pool that can support legacy servers and storage in a heterogeneous environment. Incompatibilities among the plural storage devices and servers can be masked or mimicked as needed using the virtual device architecture. True storage area network environments can be implemented and all host, fabric and storage interoperability issues can be managed at the storage server level.

The storage director logic utilizing the virtual device architecture provides a single intelligent coordination point for the configuration of server access to storage. Little or no hardware re-configuration is necessary for adding new devices or changing management of existing devices. The configuration of the storage server provides accurate configuration information and control by allowing automatic maintenance of the mapping of data sets in physical storage to servers. Maintaining an accurate map of physical storage simplifies management of storage area network significantly. Also, the storage director at the server provides for active migration of data from old storage devices to new storage devices while the devices remain online. In addition, storage objects are no longer limited in size by the size of the largest object that can be created in an array. Multiple arrays can be concatenated into a single storage object independently of host operating systems running on client servers. The storage director can also manage backup and testing operations such as making snapshots of data in the non-volatile cache, and for managing data backup by copying data from disk to tape, for example, without being routed through the client server. Furthermore, the local cache can be used to migrate data from arrays that have lost redundancy and to repair redundant storage and maintain full availability of data while an array is being repaired or rebuilt. For applications having multiple servers accessing a common data set, locking logic can be placed in the storage server in a manner which provides a simple scalable solution using the virtual device architecture.

The storage director logic in the storage server operates to consolidate caching requirements from both servers and storage to reduce the total amount of cache memory required for a storage area network. The system is able to allocate more cache to either the server the client server or storage system than either can effectively provide as internal memory. Further, the cache can be dynamically or statically allocated as defined for the applications using the system.

Figure 17:
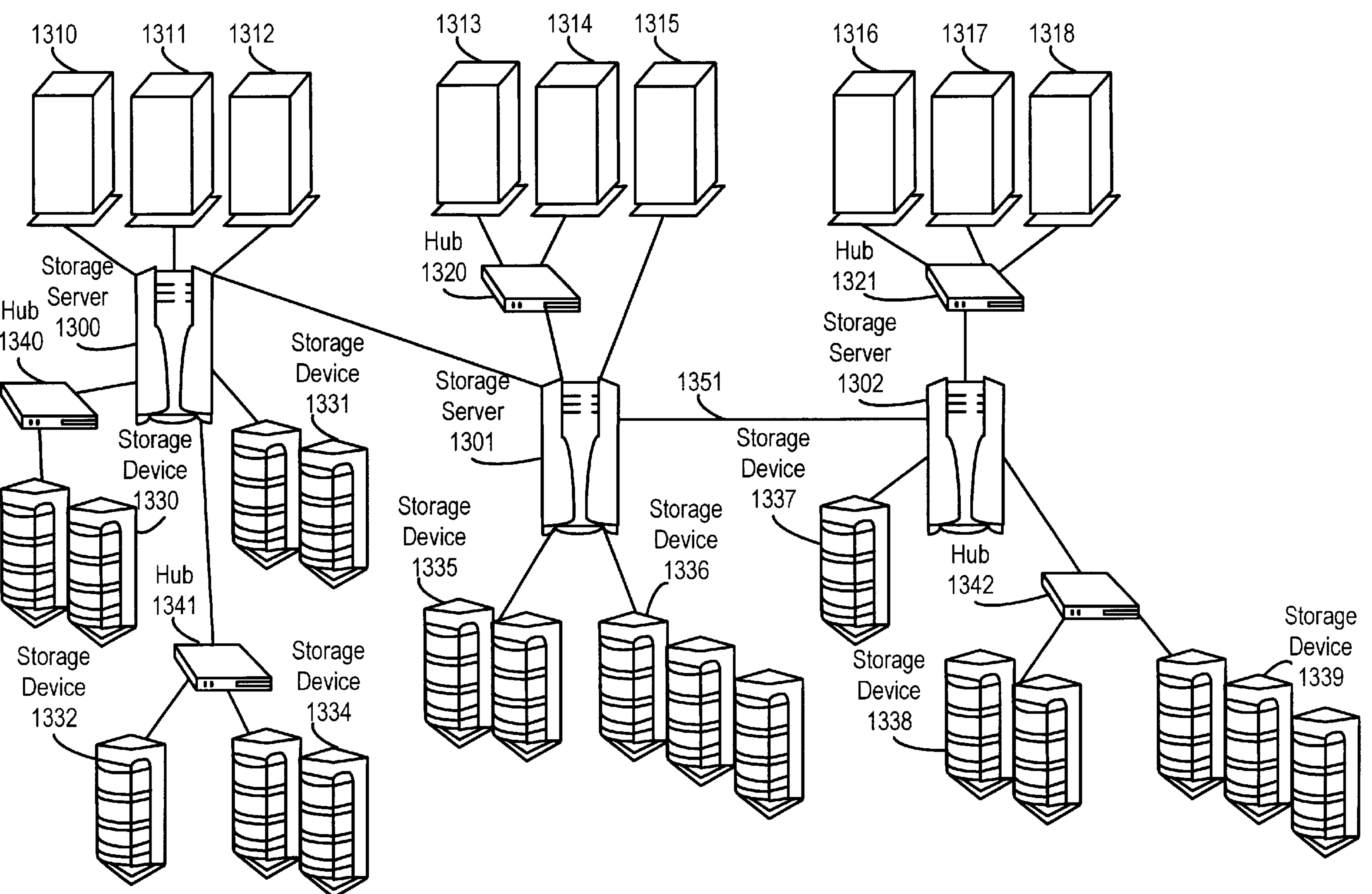
FIG. 17 illustrates a more complex storage area network including several storage servers according to the present invention with direct communication channels between them.

FIG. 17 illustrates a more rigorous example of a storage area network using a plurality of interconnected storage servers according to the present invention. Storage servers 1300, 1301, and 1302 are included, interconnected by communication channels 350, 351 using for example, a high speed protocol such as Fibre Channel, Gigabit ethernet, or ATM. Each storage server includes storage director logic and non-volatile cache in the preferred embodiment. The storage servers 1300, 1301, and 1302 are coupled to a plurality of client servers 1310 through 1318 in this example. The client servers 1313 and 1314 are connected through a hub 1320 to the storage server 1301. Likewise, the client servers 1316 through 1318 are connected to a hub 1321 which in turn is connected to the storage server 1302. The client servers 1310–1318 communicate with the storage server using storage channel protocols such as FCP described in detail above. According to these protocols, storage transactions are requested, and carry an identifier of the initiator of the request, a logical unit number (LUN), and an identifier of the target storage device. These parameters are used by the storage director logic to map the storage transaction to a virtual device. The servers also include resources to emulate the target storage device so that the client servers smoothly interoperate with the plurality of storage devices in the storage area network.

In FIG. 17, there are a plurality of storage devices 1330 through 1339 illustrated coupled to the storage servers 1300–1302. In the diagram, a variety of symbols are used to represent the storage devices, and to indicate that the network is heterogeneous and can utilize a wide variety of devices managed by the virtual device interfaces at the servers 1301 through 1302. Also, the communication channels can be varied. Thus, hubs 1340, 1341 and 1342 are included in the network to facilitate a variety of communication protocols between the storage devices and the storage servers.

User Interface

The user interface includes tools to configure virtual devices and virtual circuits, having a logical address such as a LUN number and target device identifier, to a set of physical storage devices coupled to communication interfaces in the storage server, and a set of client hosts coupled to communication interfaces in the storage server.

The user interface provides tools for configuration of the storage system. It comprises a display and a user input device, such as a mouse, touch screen or other pointing device. Data processing structures are coupled with the display and the user input device, which include logic to manage images displayed on the display, either simultaneously in groups, in a logical sequence, or in an interactive sequence. The images include a first image arranged to prompt the user to input data concerning host systems coupled to the server, a second image arranged to prompt the user to input data concerning storage resources including virtual devices and physical storage devices accessible using the server, and a third image arranged to prompt a user to input data concerning logical addresses used by the host systems to access the storage resources. Also, a communication interface is included that is arranged to provide the input data to the server.

For a storage system supporting a plurality of host systems, the first image includes a graphic tool allowing a user to add a host to the plurality of host systems. Also, the first image may comprise the display construct, such as a table listing host systems available for configuration. In a preferred embodiment, the table includes for each entry a host name field, a port number field for an identifier of the port in the server, and a protocol ID field for an identifier of the host for use by a storage channel protocol. Other fields can be included, such as a description field for a description of an associated host, and a unique identifier field, such as the field for a World Wide Name.

For storage systems supporting storage resources including a plurality of storage elements, the second image includes a graphic tool allowing a user to add storage elements to the plurality of storage elements. For example, in a preferred embodiment the second image comprises a display construct such as icons arranged in a hierarchical tree that indicate storage elements available for configuration.

In one embodiment, the display construct used for representing storage elements comprises a hierarchical tree, and the storage elements available for configuration include a mirror storage element as a head of the tree, and two or more storage elements configured as parts of the mirror storage element as branches of the tree. Likewise, storage elements available for configuration include a stripe storage element in some embodiments, as a head of the tree, and two or more storage elements configured as parts of the stripe storage element as branches of the tree. In other embodiments, storage elements available for configuration include a logical unit as head of the tree, and a plurality of logical partitions of the logical unit as branches of tree.

In yet another embodiment, the third image comprises a display construct listing logical addresses of the configured storage resources. Logic addresses comprise for example a Logical Unit Number (LUN). In another embodiment, the logical address comprises a World Wide Name of a host system mapped to particular storage resources.

Figure 18:
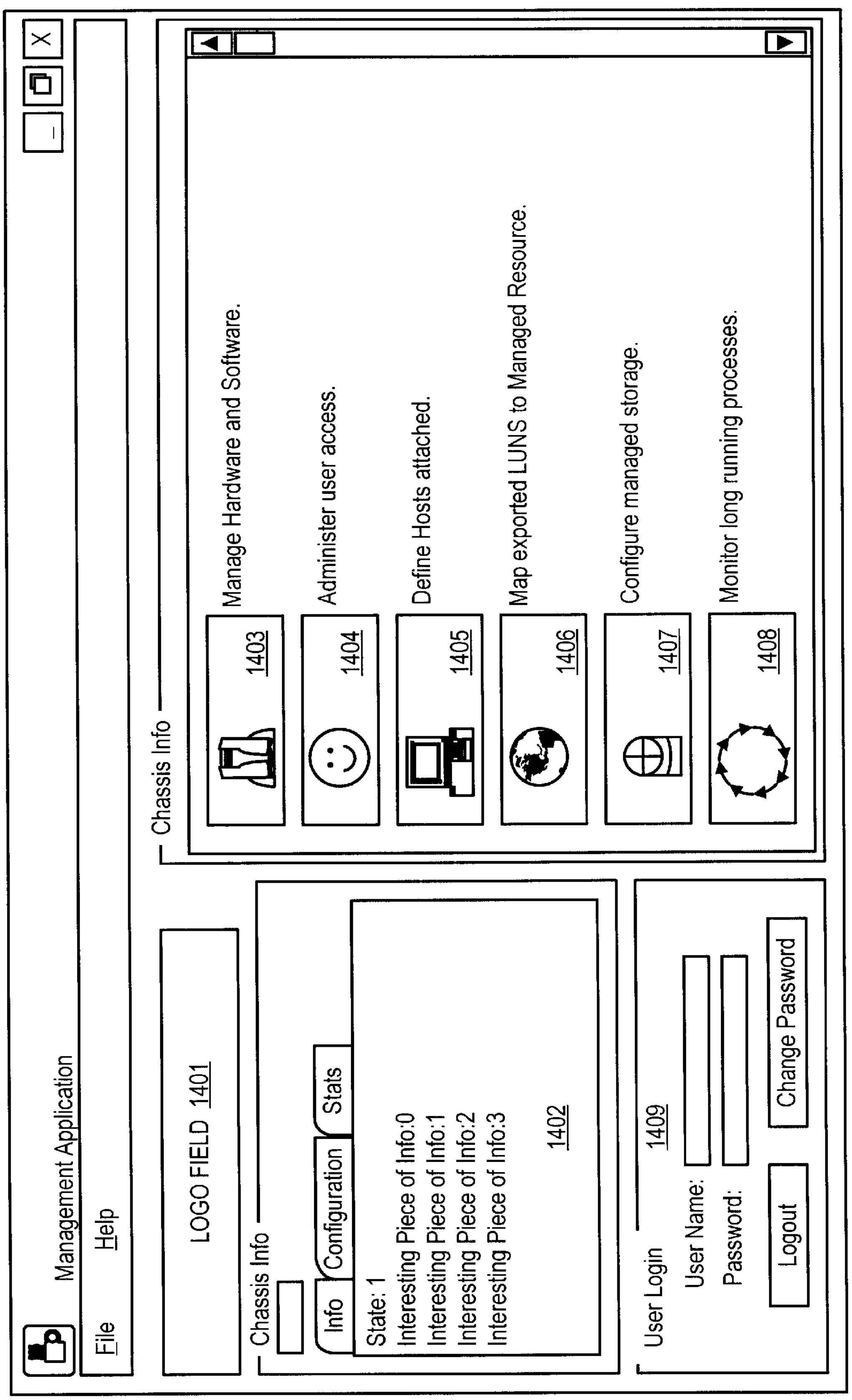
FIG. 18 illustrates an example of an opening image for a graphical user interface according to the present invention.

FIG. 18 illustrates an image produced by data processing structures for use in configuring a storage server according to the present invention. The image includes a window 1400 having a field 1401 for displaying a logo, a field 1402 for displaying basic information concerning the chassis of the server, and a set of icons 1403–1408, which when selected, launch management applications. Routines providing for managing hardware and software are launched by button 1403, routines for administering user access are launched by button 1404, and routines for monitoring long-running processes in the server are launched by button 1408. According to the present invention, a function for defining hosts attached to the server is launched by button 1405, a function for mapping exported LUNs to managed resources is launched by button 1406, and a function for configuring managed storage is launched by button 1407.

The window 1400 also includes a user logon dialog box 1409, including a field for entering a user name and a field for entering a password.

Host Manager

The user launches a host manager using button 1405. This section describes a Java based user interface (UI) for defining hosts (servers) to storage server. The management software opens a window, such as the window 1450 shown in FIG. 19, that presents a table 1451 with entries that contain a host name in column 1452, a port number in column 1453, an initiator ID in column 1454 and a description in column 1455 for each host available for configuration and use. Other fields include a network interface card identifier in column 1456, and a unique host identifier in column 1457. The unique host identifier in a preferred example is the World Wide Number value for a Fibre Channel host.

The host manager is sub-component of the storage server's Java based management application that enables the user to assign a name and a description to a NIC port and initiator ID to facilitate the process of defining a LUN. General functionality is available through mouse pop-up, tool bar button and action menus to access an existing host or to define a new host, using for example an add new host button 1458, a change host button 1459, or a delete host button 1460.

Figure 19:
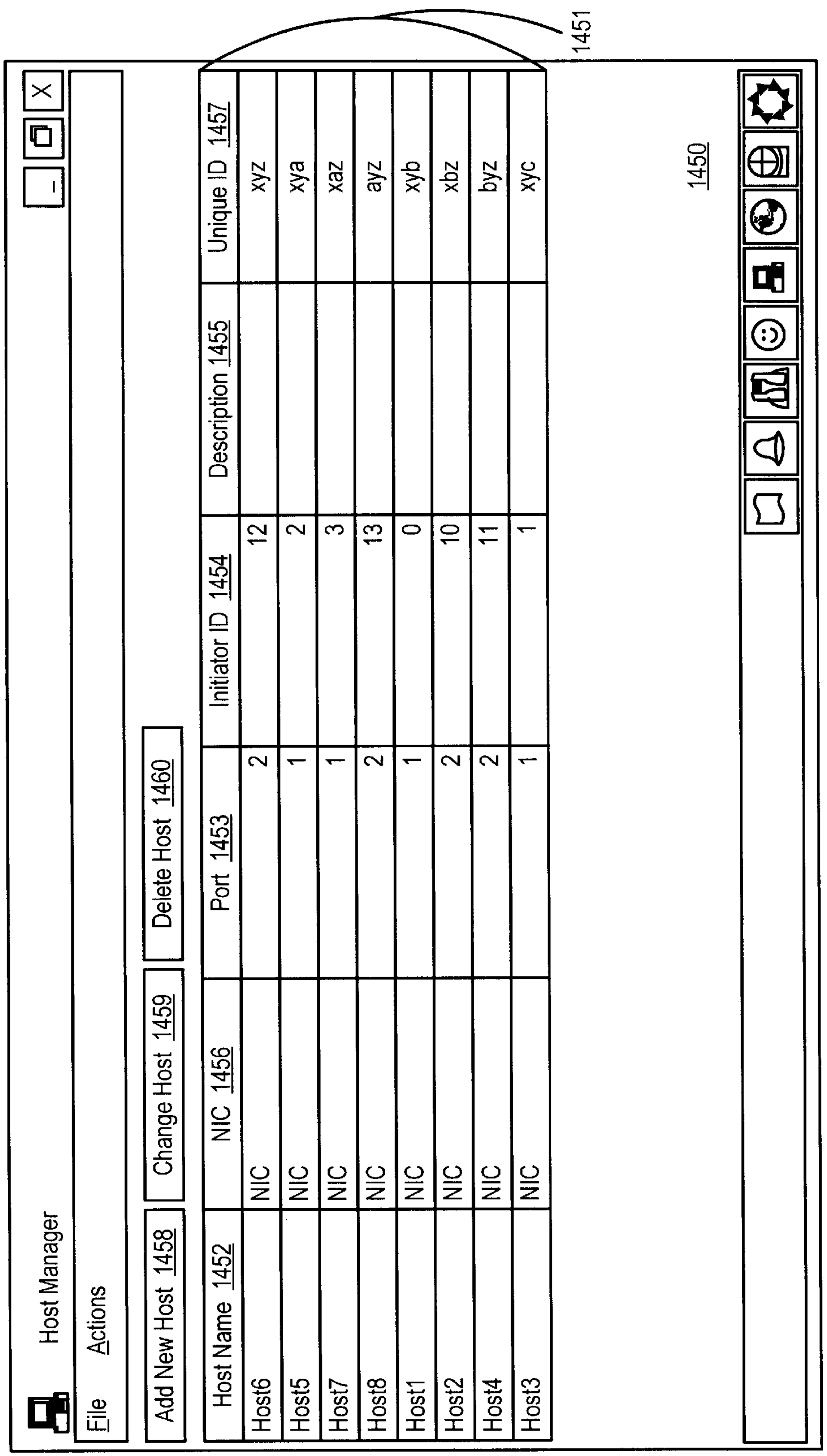
FIG. 19 illustrates an image used for prompting a user to add or modify a host configuration according to the present invention.
Figure 20:
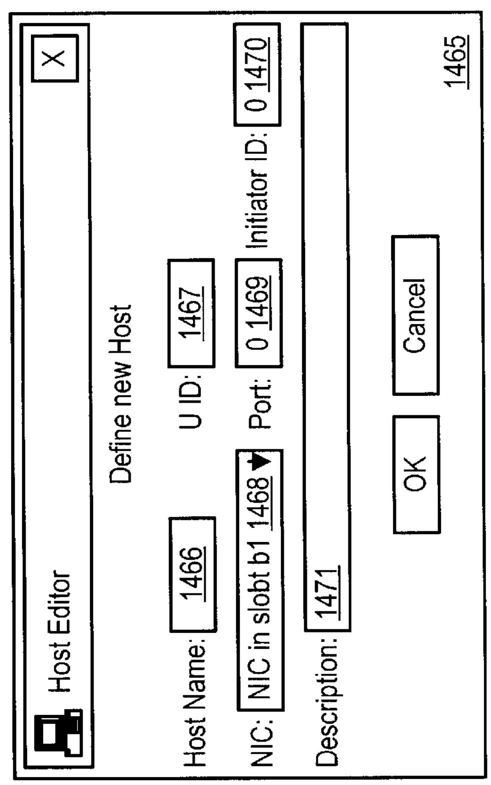
FIG. 20 illustrates a dialog box used for adding a host which is opened using the image of FIG. 19.

FIG. 20 illustrates a dialog box 1465 used in response to the add new host button 1458 of FIG. 19. The dialog box 1465 includes a field 1466 for inserting a host name, and a field 1467 for inserting a unique identifier of the host. Fields are also provided for inserting information about the network interface card 1458, a port number 1459, and an initiator ID 1470. Finally, a description field 1471 is included.

Figure 21:
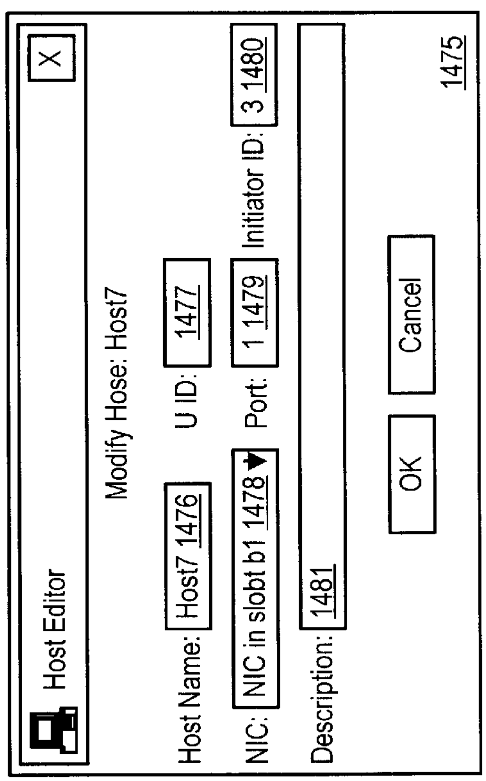
FIG. 21 illustrates a dialog box used for modifying a host which is opened using the image of FIG. 19.

FIG. 21 illustrates a dialog box 1475 used for modifying a host. It includes the fields 1476 for changing a host name, 1477 for changing a host unique identifier, 1478 for changing the network interface card identifier, 1479 for changing a port number, and 1484 for changing an initiator ID associated with the host. Also, a field 1481 is included for inserting or changing description text.

Hosts can be sorted for example by host name, NIC, port, initiator ID and description.

This User Interface consists of menus and a table, or other graphic construct, for displaying the host information. When the user enters the host manager panel, the table is populated with all the existing hosts. The user may select a row in the table. Each row contains information about one host. The user may then choose to modify or delete the host. If modify is chosen, a dialog box will appear allowing the user to change the host name and/or the description. The user will then hit the OK or Cancel button. If OK is hit, the changes will appear in the table and be sent to the server. If delete is chosen, a dialog box will appear with a label indicating the host to be deleted and buttons for OK and Cancel. If OK is hit, the host row will be deleted from the table and the deletion will be made at the server. If Add is chosen, a dialog box will appear that enables the user to add all information about a host. If OK is hit, a new row will be added to the table for that new host and a add will be done at the server. Clicking the column label will sort the columns.

Storage Mapping

Figure 22:
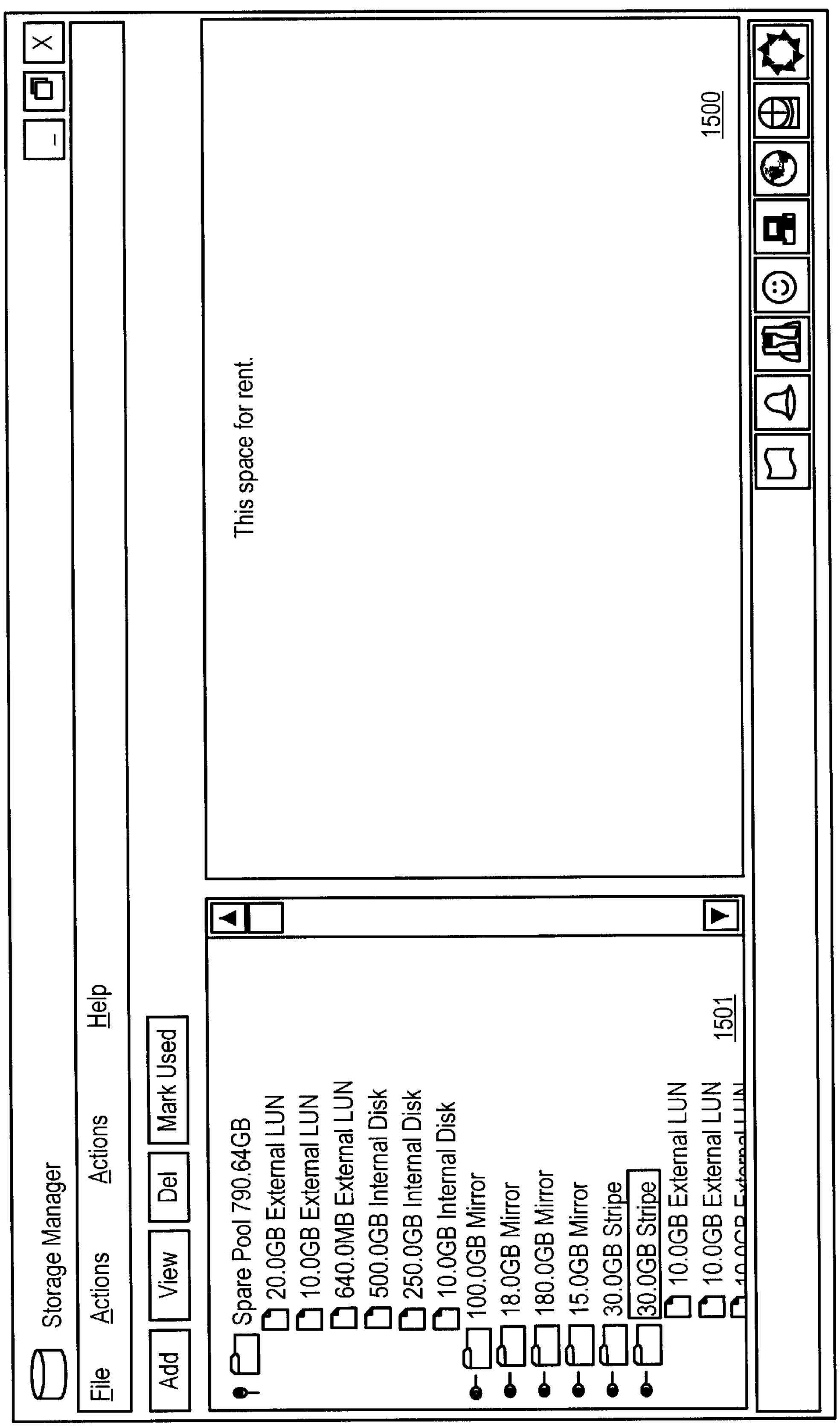
FIG. 22 illustrates an image used for prompting a user to add or revise storage elements available for use in a server according to the present invention.

Using button 1407 of FIG. 18, the user launches a storage manager routine which displays an image such as that shown in FIG. 22. The image of FIG. 22 includes a window 1500 that includes a hierarchical tree display construct 1501 for displaying storage elements. Storage elements are defined using a tree structure (e.g. mirror to stripes to disks). This allows the user to build up their storage in a organized manner consistent with the way they think about storage.

Representative types of storage element include the following:

- Mirror
- Stripe
- External LUN
- Internal Disk
- SSD
- Storage Collection
- Storage Partition By building these elements up in a tree (using for example a Microsoft Windows Explorer-like tree display) the user will be able to pre-configure storage for use in Virtual Circuits. Each element can be partitioned up and these partitions can be used in different ways. For example a stripe set can be partitioned up, with one partition being exported as one LUN and the other being used as one member in a mirror (which could then be partitioned itself).

If a storage element has been partitioned, the partitions will be kept in a Storage Collection, which will be the child of the partitioned element. For elements that are not partitioned, this partition collection will not be there. Each partition will be identified by what type of storage it is partitioning—a mirror partition, a disk partition, etc. The partitions of a given storage element can not be merged into a single partition unless all partitions of that element are available (i.e. the entire storage element is unused). To do this, the user will select a partitioned storage element that has only unused partitions, and hit the "unpartition" button.

If there are dedicated spares, these will also be kept in a Storage Collection which will be the child of the element to which those spares are dedicated.

So each storage element can potentially have as children: a partition collection, a spare collection and the actual storage elements that comprise the parent element.

The Storage Manager is, in some sense, a view into a Storage Rollcall Table which lists all connected storage on a server. Each available storage element will be seen as the head of a storage tree. For example, a mirror will be shown as available, but the stripes and disks that make up the branches of that mirror are not available, since they belong to the mirror. For them to be reused somewhere else they would need to be removed from that mirror (and therefore from the storage tree that descends from that mirror). In one embodiment, this will be done via drag and drop, in a manner like that by which files are moved from one directory to another in the Windows NT file explorer program.

The tree of all storage (used and unused) is shown on the left half of the display in this example, with each storage element having an icon representing what type it is and some identifying name or ID.

Beneath the tree, on the right side of the window or in another convenient location, the list of available (unused) storage is shown. This is a list of all storage that is not in use by another storage element, or a virtual circuit. It is expected that most storage that is not being explicitly used will be put in the general spare pool. This available (not in use) storage list is expected to be mostly used as a convenience to let the user easily find unused storage elements from which to build new storage trees. For example, if a solid state storage device (SSD) partition is being mirrored by a stripe set (RAID 0), the partition and stripe set will both be visible in the available list until they are put into the mirror. Once the mirror is created from the two members, it will be seen in the available list until it is incorporated into a virtual circuit.

On the right will be the information and parameters associated with whichever of the elements in the tree the user selects by clicking on it with the mouse. When a storage element that is visible in the available list is selected, it will be selected in both the available list and the storage tree.

Add and Delete functions are provided to create or remove entries, as well as a Modify function so that by using tools provided by the user interface, the user can change things like "owner" or "last serviced" or "description", etc. fields for storage elements in the tree. The user will specify what it is that they are adding (mirror, stripe, disk, etc.), and an appropriate set of controls will be given them.

For an internal disk and external LUN, the user will specify things like name, size, maybe manufacturer. This is somewhat of a special case, since a disk is a piece of hardware and would therefore be detected automatically. The only time the user would add a disk is if they are just putting a placeholder in for some hardware that they will be attaching later. This may also be done for SSD boards.

For RAID arrays, the user will specify that they want to create an array of a given RAID level (mirror or stripe initially) and will then be able to specify the storage elements that will be members of that array. This specification will probably be done by selecting entries in a list of available storage elements, and the array capacity will be determined by the capacity of its members. The storage elements that are used as members of the array will then be tagged as unavailable (since they are part of the array) and the array itself will be added to the list of available storage. Each RAID array can also have dedicated spares assigned to that array in case one of the members fails.

Storage elements can also be partitioned by selecting the element to be partitioned and specifiying what size chunk the user wants. If the element was previously unpartitioned, two partitions will be created—the partition the user asked for and another partition which is the rest (unused portion) of the storage. Additional partitions will come out of the unused portion as they are created.

The details display for each storage element will show as much information as is available. One of the things shown in a preferred system is what a particular storage element's partitions look like (size and position), so that when unused partitions are contiguous and get automatically turned into a single partition, it will not take the user by surprise.

LUN Mapping

Using the button 1406 of FIG. 18, a LUN map routine is instituted which presents the image shown in FIG. 23. The LUN map is essentially a list 1550 of LUNs and their associated data. These will be displayed as a list of names and descriptions. The VC (Virtual Circuit) that is associated with any given LUN is shown on this display. It is made visible when the user selects an entry from the LUN map and requests details.

The LUN map will show the existing list of LUNs by name, description, or other fields.

Fields should include

- Name 1551
- Description 1555
- Exported Status 1552
- Host 1553
- Storage Element(s) 1554

The LUN map allows

- Sorting based on various fields.
- Filtering based on fields. This is only needed if more than one LUN is operated on at a time (for example, enable/disable).
- Selecting a LUN for deletion or editing/viewing.
- Defining and adding a new LUN.
- Importing existing LUNs. (Done via "Learn Mode" on hardware startup)
- Adding a member and starting a Hot Copy Mirror process on a LUN.
- Exporting and unexporting a LUN—this will basically start and stop the flow of data from the host.

Figure 24:
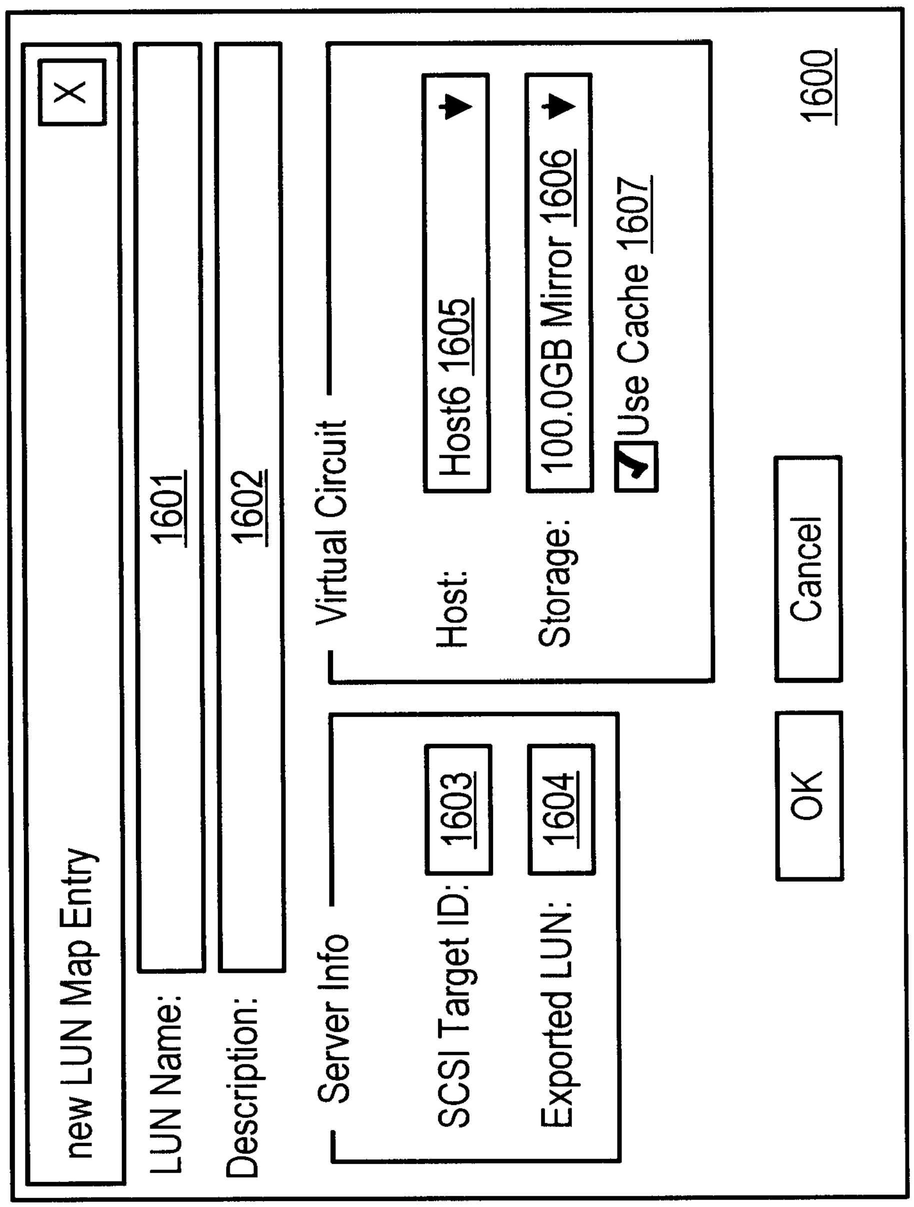
FIG. 24 illustrates a dialog box for creating a map entry, which is opened using the image of FIG. 23.

Virtual Circuits are defined (to the user) as a storage tree or other graphic construct connected to a host, such as the dialog box 1600 shown in FIG. 24, which is launched using a button 1556 of FIG. 23. The dialog box 1600 includes a field 1601 for entry of a LUN name, a field 1602 for entry of a description, and field 1603 for entry of a target ID, and a field 1604 for entry of information about an exported LUN. Pop-up menus are launched using a host button 1605 for a list of available host, and a storage button 1606 for a list of available storage elements. A cache selection button 1607 is implemented as a check box.

Figure 26:
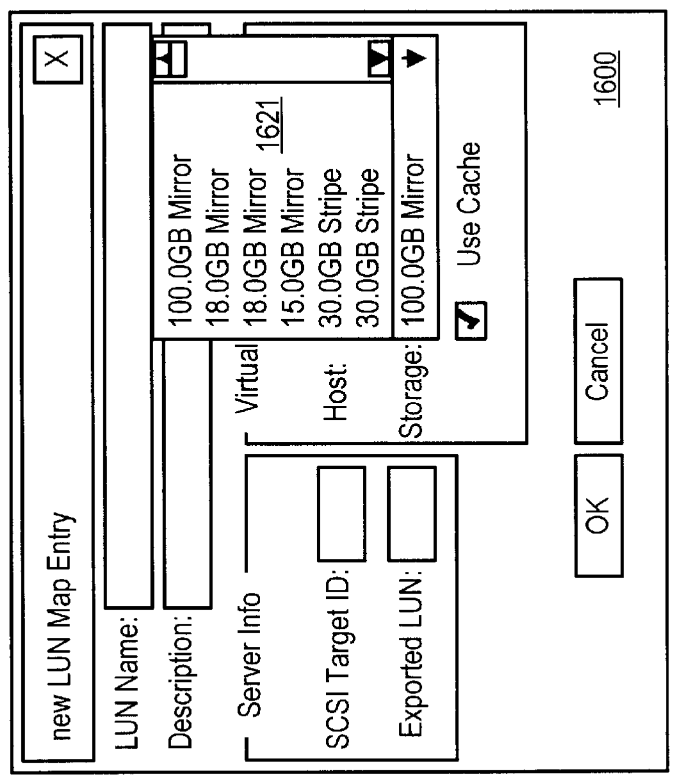
FIG. 26 illustrates a pop-up menu which is opened using the image of FIG. 24 for selecting storage elements to be included in a virtual circuit.
Figure 25:
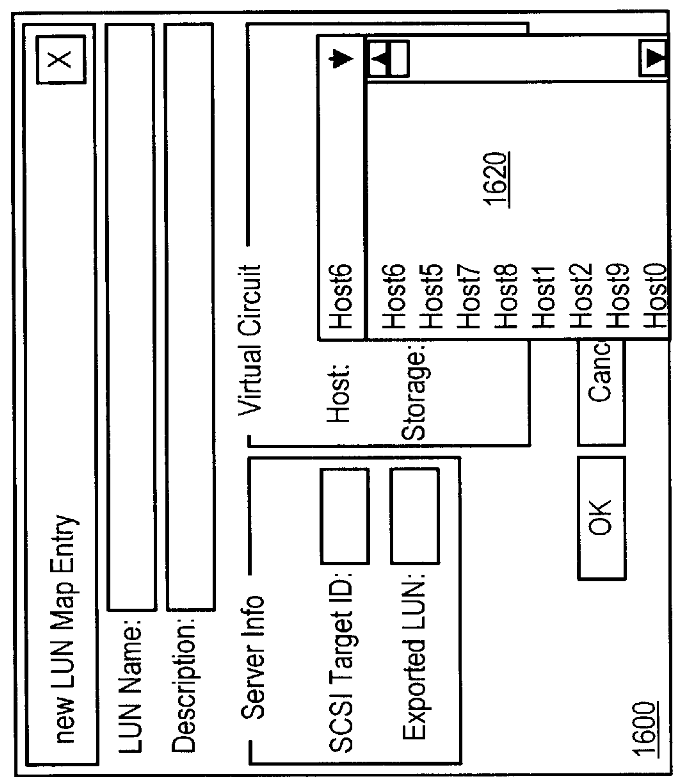
FIG. 25 illustrates a pop-up menu which is opened using the image of FIG. 24 for selecting a host to be included in a virtual circuit.

FIG. 25 illustrates the dialog box 1600 of FIG. 24 in which a host list 1620 is popped up by which the users are prompted to select a particular host for a virtual circuit. FIG. 26 illustrates the dialog box 1600 of FIG. 24, with a list 1621 which is popped up in response to selection of a storage button 1606 for a virtual circuit.

The storage tree is actually a tree of storage elements (e.g., a mirror which is comprised of some number of stripe sets, which in turn are comprised of some number of disks). The host is actually a server with a particular initiator ID, connected to a specific port on a NIC. This will be defined by the user via their selection of a pre-defined host and a pre-defined storage tree that represents some amount of available storage.

The use of cache is restricted to "on" or "off," using the check box 1607 of FIG. 24. Alternative systems provide tools for specification of cache size or cache algorithm. The cache use can be turned on or off on the fly without interrupting the flow of data along the virtual circuit. The default when a LUN is created will be "on".

One embodiment of the LUN Map will have the functionality necessary for creating virtual circuits. This will consist of a multi-column table with two columns; one for Host and one for Storage. The creation of a LUN will automatically export it, and the functions available will be "Add", "Modify" and "Delete".

The LUN Map display of FIG. 23 is a place that Hot Copy Mirrors are defined using a button 1557, since this would usually be done to an existing LUN. The process will be one of selecting the LUN, then selecting the storage tree to add to the existing storage tree via the addition of a mirror or the extension of an existing mirror (e.g., two-way to three-way).

Conclusion

The foregoing description of various embodiments of the invention have been presented for purposes of illustration and description. The description is not intended to limit the invention to the precise forms disclosed. Many modifications and equivalent arrangements will be apparent to people skilled in the art.

What is claimed is:

1. An intermediate device for a storage network, comprising:

a plurality of communication interfaces, the plurality of communication interfaces including at least a first interface adapted for communication with a first storage device which stores a data set, a second interface adapted for communication with a second storage device, and a third interface adapted for communication with a client processor;

data transfer for resources coupled to the plurality of interfaces which transfer data access requests identifying the data set from the third interface to the first interface;

a logic engine, coupled to the first and second interfaces, which in response to a control signal, manages transfer of the data set through the first interface from the first storage device and through the second interface to the second storage device;

logic to assign a priority to the transfer in relation to data access requests from the client processor, and to manage the transfer in response to the priority; and, data structures which store status information concerning progress of the transfer, including a parameter indicating an extent of the data set which already copied to the second storage device.

2. The intermediate device of claim 1, wherein the data transfer resource comprise:

a plurality of driver modules, and configurable logic linking driver modules in the plurality of driver modules into data paths, the data paths including respective sets of driver modules.

3. The intermediate device of claim 2, wherein the configurable logic includes memory storing lists of the respective sets of driver modules, and a user interface accepting data for the lists.

4. The intermediate device of claim 2, wherein the plurality of driver modules includes one or more hardware driver modules to manage respective communication interfaces, and one or more internal driver modules to perform data path tasks independently of the plurality of communication interfaces.

5. The intermediate device of claim 2, including logic to update the configurable logic after the transfer completes.

6. The intermediate device of claim 1, wherein the logic engine comprises data structures which store status information concerning the transfer.

7. The intermediate device of claim 1, wherein the data transfer resources include logic operable during the transfer of the data set which directs data access requests to the first and second storage devices in response to a type of data access request and a status of the transfer.

8. The intermediate device of claim 1, including logic to notify the client processor after the transfer completes.

9. The intermediate device of claim 1, wherein the data set has a logical address, and the data transfer resources are responsive to the logical address to direct data access requests to the data set.

10. The intermediate device of claim 1, wherein the data access request comprises a request to write data in the data set, and the data transfer resources include logic operable during the transfer of the data set which directs the data access request both the first and second storage devices if the request identifies data already copied to the second device.

11. The intermediate device of claim 1, wherein the data access request comprises a request to read data in the data set, and the data transfer resources include logic operable during the transfer of the data set which directs the data access request to the second storage device if the request identifies data already copied to the second device.

12. The intermediate device of claim 1, wherein the data access request comprises a request to read data in the data set, and the data transfer resources include logic operable during the transfer of the data set which directs the data access request to the first storage device.

13. The intermediate device of claim 1, wherein the data transfer resources comprise redundant data paths.

14. The intermediate device of claim 1, including a user interface by which the control signal is supplied.

15. A method for copying a data set in use by a client, and stored in a first device to a second device, comprising:

placing an intermediate device in a path between the client and the first and second storage devices;

transferring copies of blocks of data in the data set from the first device to the second device through the intermediate device until a copy of the data set is stored in the second device;

transferring data access requests having one of a plurality of types, during the transferring from the client through the intermediate device to at least one of the first and second devices in response to progress of the transfer and the type of data access request;

assigning a priority to the transferring of data access requests relative to the transferring copies of blocks; and, maintaining a data structure in the intermediate device storing a parameter indicating an extent of the data set already transferred to the second device.

16. The method of claim 15, wherein the plurality of types of data access request includes a write request to write data to a location in the data set, and including transferring a write request to the first device if the location is outside said extent.

17. The method of claim 15, wherein the plurality of types of data access requests includes a write request to write data to a location in the data set, and including transferring a write request to the second device if the location is inside said extent.

18. The method of claim 15, wherein the plurality of types of data access requests includes a write request to write data to a location in the data set, and including transferring a write request to the first device and to the second device if the location is inside said extent.

19. The method of claim 15, including assigning a higher priority to the transferring of data access requests than to the transferring of copies of blocks.

20. The method of claim 15, wherein the transferring of copies of blocks includes:

(i) setting a parameter indicating a size and location of the data set;

(ii) generating a request to copy a block from the data set to a buffer in the intermediate device;

(iii) generating a request to transfer the block from the buffer to the second device;

(iv) setting a parameter indicating blocks from the data set stored in the second device; and (v) repeating the steps (ii) through (iv), until a copy of the data set is stored in the second device.

21. The method of claim 20, including assigning a priority to the transferring of data access requests from the client relative to the requests to copy blocks and the requests to transfer the blocks.

22. The method of claim 15, including fulfilling the data access requests through the intermediate device.

23. The method of claim 15, including fulfilling the data access requests through the intermediate device, and assigning a priority to the fulfilling higher than the transferring.

24. The method of claim 15, wherein the transferring of copies of blocks comprises a background process without blocking data access requests from the client.

* * * * *